US012392004B2

(12) United States Patent
Tanaka et al.

(10) Patent No.: US 12,392,004 B2
(45) Date of Patent: Aug. 19, 2025

(54) GRAIN ORIENTED ELECTRICAL STEEL SHEET, FORMING METHOD FOR INSULATION COATING OF GRAIN ORIENTED ELECTRICAL STEEL SHEET, AND PRODUCING METHOD FOR GRAIN ORIENTED ELECTRICAL STEEL SHEET

(71) Applicant: NIPPON STEEL CORPORATION, Tokyo (JP)

(72) Inventors: Ichiro Tanaka, Tokyo (JP); Takashi Kataoka, Tokyo (JP); Kazutoshi Takeda, Tokyo (JP); Masamitsu Kubota, Tokyo (JP); Hirotoshi Tada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 894 days.

(21) Appl. No.: 17/428,234

(22) PCT Filed: Feb. 7, 2020

(86) PCT No.: PCT/JP2020/004890

§ 371 (c)(1),
(2) Date: Aug. 3, 2021

(87) PCT Pub. No.: WO2020/162611

PCT Pub. Date: Aug. 13, 2020

(65) Prior Publication Data

US 2022/0243315 A1 Aug. 4, 2022

(30) Foreign Application Priority Data

Feb. 8, 2019 (JP) ................................ 2019-021285

(51) Int. Cl.
*C21D 9/46* (2006.01)
*C21D 3/04* (2006.01)
(Continued)

(52) U.S. Cl.
CPC ................ *C21D 9/46* (2013.01); *C21D 3/04* (2013.01); *C21D 8/0205* (2013.01);
(Continued)

(58) Field of Classification Search
CPC .................................................. C22C 38/004
See application file for complete search history.

(56) References Cited

U.S. PATENT DOCUMENTS

2013/0017408 A1 1/2013 Sakai et al.
2017/0233871 A1 8/2017 Han et al.
(Continued)

FOREIGN PATENT DOCUMENTS

CN 108474054 A 8/2018
EP 0 565 029 A1 10/1993
(Continued)

OTHER PUBLICATIONS

Espacenet machine translation of JP-2008031499-A retrieved on May 6, 2024 (Year: 2008).*

*Primary Examiner* — Keith D. Hendricks
*Assistant Examiner* — Joshua S Carpenter
(74) *Attorney, Agent, or Firm* — Birch, Stewart, Kolasch & Birch, LLP

(57) ABSTRACT

A grain oriented electrical steel sheet includes a base steel sheet, an oxide layer, and a tension-insulation coating. When a glow discharge spectroscopy is conducted in a region from a surface of the tension-insulation coating to an inside of the base steel sheet, a sputtering time $Fe_{0.5}$ at which a Fe emission intensity becomes 0.5 times as compared with a saturation value thereof and a sputtering time $Fe_{0.05}$ at which a Fe emission intensity becomes 0.05 times as compared with the saturation value satisfy $0.01<(Fe_{0.5}-Fe_{0.05})/$
(Continued)

$Fe_{0.5}$<0.35. Moreover, a magnetic flux density B8 in a rolling direction of the grain oriented electrical steel sheet is 1.90 T or more.

6 Claims, 5 Drawing Sheets

(51) Int. Cl.

| | |
|---|---|
| ***C21D 8/02*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.

CPC ......... *C21D 8/0226* (2013.01); *C21D 8/0236* (2013.01); *C21D 8/1272* (2013.01); *C21D 8/1283* (2013.01); *C22C 38/001* (2013.01); *C22C 38/004* (2013.01); *C22C 38/02* (2013.01); *C22C 38/04* (2013.01); *C22C 38/06* (2013.01); *C21D 2201/05* (2013.01); *H01F 1/14783* (2013.01)

(56) References Cited

U.S. PATENT DOCUMENTS

| | | | | |
|---|---|---|---|---|
| 2017/0298467 | A1 | 10/2017 | Suehiro et al. | |
| 2018/0066334 | A1 * | 3/2018 | Mogi ..................... | C21D 6/005 |
| 2019/0010572 | A1 | 1/2019 | Han et al. | |
| 2019/0256938 | A1 * | 8/2019 | Takenaka .................. | H01F 1/16 |

FOREIGN PATENT DOCUMENTS

| | | | | | |
|---|---|---|---|---|---|
| JP | 60-131976 | A | | 7/1985 | |
| JP | 5-311453 | A | | 11/1993 | |
| JP | 9-209165 | A | | 8/1997 | |
| JP | 9-279359 | A | | 10/1997 | |
| JP | 2001-303215 | A | | 10/2001 | |
| JP | 2002-249880 | A | | 9/2002 | |
| JP | 2003-313644 | A | | 11/2003 | |
| JP | 2004-225153 | A | | 8/2004 | |
| JP | 2005-68525 | A | | 3/2005 | |
| JP | 2008031499 | A | * | 2/2008 | |
| JP | 6463458 | B2 | | 2/2019 | |
| WO | WO 2011/125672 | A1 | | 10/2011 | |
| WO | WO 2016/056501 | A1 | | 4/2016 | |
| WO | WO-2016171124 | A1 | * | 10/2016 | ........... B23K 26/359 |
| WO | WO-2018084203 | A1 | * | 5/2018 | ............. B22D 11/00 |

* cited by examiner

GRAIN ORIENTED ELECTRICAL STEEL SHEET, FORMING METHOD FOR INSULATION COATING OF GRAIN ORIENTED ELECTRICAL STEEL SHEET, AND PRODUCING METHOD FOR GRAIN ORIENTED ELECTRICAL STEEL SHEET

TECHNICAL FIELD

The present invention relates to a grain oriented electrical steel sheet, a forming method for an insulation coating of a grain oriented electrical steel sheet, and a producing method for a grain oriented electrical steel sheet.

Priority is claimed on Japanese Patent Application No. 2019-021285, filed on Feb. 8, 2019, and the content of which is incorporated herein by reference.

BACKGROUND ART

A grain oriented electrical steel sheet is the steel sheet where silicon (Si) of approximately 0.5 to 7 mass % is included and crystal orientation is aligned with {110}<001> orientation (Goss orientation) by utilizing a phenomenon called secondary recrystallization. Herein, the {110}<001> orientation represents that {110} plane of crystal is aligned parallel to a rolled surface and <001> axis of crystal is aligned parallel to a rolling direction.

The grain oriented electrical steel sheet is mainly used for an iron core of a transformer and the like as a soft magnetic material. Since the grain oriented electrical steel sheet significantly influences a performance of the transformer, investigation has been eagerly carried out in order to improve excitation characteristics and iron loss characteristics of the grain oriented electrical steel sheet.

A typical method for producing the grain oriented electrical steel sheet is as follows.

A steel piece with a predetermined composition is heated and hot-rolled to obtain a hot rolled steel sheet. The hot rolled steel sheet is hot-band-annealed as necessary, and then is cold-rolled to obtain a cold rolled steel sheet. The cold rolled steel sheet is decarburization-annealed to activate primary recrystallization. A decarburization annealed steel sheet after the decarburization annealing is final-annealed to activate the secondary recrystallization.

After the decarburization annealing and before the final annealing, aqueous slurry including an annealing separator whose main component is MgO is applied to a surface of the decarburization annealed steel sheet, and then is dried. The decarburization annealed steel sheet is coiled, and then is final-annealed. During the final annealing, MgO included in the annealing separator is reacted to $SiO_2$ included in an internally oxidized layer formed on a surface of the steel sheet by the decarburization annealing, and thereby, a primary layer (referred to as "glass film" or "forsterite film") which mainly includes forsterite ($Mg_2SiO_4$) is formed on the surface of the steel sheet. In addition, after forming the glass film (that is, after the final annealing), the solution which mainly includes colloidal silica and phosphate for instance is applied to the surface of the final annealed steel sheet and is baked, and thereby, a tension-insulation coating (referred to as "secondary layer") is formed.

The above glass film functions as an insulator and also improves adhesion of the tension-insulation coating formed on the glass film. The tension is imparted to the base steel sheet by adhering the glass film, the tension-insulation coating, and the base steel sheet. As a result, the iron loss as the grain oriented electrical steel sheet decreases.

However, since the glass film is a non-magnetic material, the existence of the glass film is unfavorable from a magnetic standpoint. Moreover, an interface between the base steel sheet and the glass film has intruding structure such that the glass film is intricately intertwined therewith, and the intruding structure tends to suppress domain wall motion when the grain oriented electrical steel sheet is magnetized. Thus, the existence of the glass film may cause an increase in the iron loss.

For instance, in a case where the formation of the glass film is suppressed, the formation of the intruding structure may be suppressed, and thus, the domain wall may easily move during being magnetized. However, in a case where the formation of the glass film is simply suppressed, the adhesion of the tension-insulation coating is not ensured, and thus, the sufficient tension is not imparted to the base steel sheet. As a result, it is difficult to reduce the iron loss.

As described above, at present, in a case where the glass film is removed from the grain oriented electrical steel sheet, the domain wall may be easily moved, and thus, it is expected that the magnetic characteristics are improved. On the other hand, in the above case, the tension is hardly imparted to the base steel sheet, and thus, it is unavoidable that the magnetic characteristics (especially, the iron loss characteristics) deteriorate. Therefore, in a case where the grain oriented electrical steel sheet in which the glass film is removed whereas the coating adhesion is ensured is realized, it is expected that the magnetic characteristics are improved.

In the past, it has been investigated to improve the adhesion of the tension-insulation coating for the grain oriented electrical steel sheet without the glass film.

For instance, Patent Document 1 discloses technique to wash a steel sheet by being immersed in aqueous solution of 2 to 30% as sulfuric acid concentration with sulfuric acid or sulfate before forming a tension-insulation coating. Patent Document 2 discloses technique to conduct pretreatment for a steel sheet surface using oxidizing acid before forming a tension-insulation coating. Patent Document 3 discloses a grain oriented silicon steel sheet where an externally oxidized layer containing mainly silica is included and where metallic iron of 30% or less in cross-sectional area fraction is included in the externally oxidized layer. Patent Document 4 discloses a grain oriented electrical steel sheet where fine linear grooves are directly formed on a base steel surface of the grain oriented electrical steel sheet and where the fine linear grooves are with depth of 0.05 to 2 μm and with an interval of 0.05 to 2 μm.

RELATED ART DOCUMENTS

Patent Documents

[Patent Document 1] Japanese Unexamined Patent Application, First Publication No. H05-311453
[Patent Document 2] Japanese Unexamined Patent Application, First Publication No. 2002-249880
[Patent Document 3] Japanese Unexamined Patent Application, First Publication No. 2003-313644
[Patent Document 4] Japanese Unexamined Patent Application, First Publication No. 2001-303215

SUMMARY OF INVENTION

Technical Problem to be Solved

As described above, the grain oriented electrical steel sheet without the glass film is inferior in the adhesion of the tension-insulation coating. For instance, in a case where the above grain oriented electrical steel sheet is held for long time, the tension-insulation coating may be delaminated. In the case, the tension is not imparted to the base steel sheet. For the grain oriented electrical steel sheet, it is exceedingly important to improve the adhesion of the tension-insulation coating.

The techniques disclosed in Patent Document 1 to Patent Document 4 intend to improve the adhesion of the tension-insulation coating respectively. However, in the techniques, it is unclear that the adhesion is stably obtained and that the effect in improving the iron loss is obtained thereby. The above techniques are not enough to obtain the effect.

The present invention has been made in consideration of the above mentioned situations. An object of the invention is to provide the grain oriented electrical steel sheet in which the adhesion of the tension-insulation coating is excellent and the iron loss characteristics are also excellent (the iron loss is low) even without the glass film (forsterite film). In addition, an object of the invention is to provide the method for forming the above insulation coating and for producing the above grain oriented electrical steel sheet.

Solution to Problem

An aspect of the present invention employs the following.

(1) A grain oriented electrical steel sheet according to an aspect of the present invention, the grain oriented electrical steel sheet without a forsterite film includes:

a base steel sheet;

an oxide layer arranged in contact with the base steel sheet; and a tension-insulation coating arranged in contact with the oxide layer, wherein the base steel sheet includes, as a chemical composition, by mass %, 2.5 to 4.0% of Si, 0.05 to 1.0% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, the tension-insulation coating is a phosphate-silica mixed tension-insulation coating with an average thickness of 1 to 3 μm, when a glow discharge spectroscopy is conducted in a region from a surface of the tension-insulation coating to an inside of the base steel sheet, when a sputtering time at which a Fe emission intensity becomes 0.5 times as compared with a saturation value thereof on a depth profile is referred to as $Fe_{0.5}$ in unit of seconds, and when a sputtering time at which a Fe emission intensity becomes 0.05 times as compared with the saturation value on the depth profile is referred to as $Fe_{0.05}$ in unit of seconds, the $Fe_{0.5}$ and the $Fe_{0.05}$ satisfy $0.01<(Fe_{0.5}-Fe_{0.05})/Fe_{0.5}<0.35$, and a magnetic flux density B8 in a rolling direction of the grain oriented electrical steel sheet is 1.90 T or more.

(2) A forming method for an insulation coating of a grain oriented electrical steel sheet according to an aspect of the present invention, the forming method for the insulation coating of the grain oriented electrical steel sheet without a forsterite film includes an insulation coating forming process of forming a tension-insulation coating on a steel substrate, wherein, in the insulation coating forming process, a solution for forming a phosphate-silica mixed tension-insulation coating is applied to an oxide layer of the steel substrate and the solution is baked so as to form the tension-insulation coating with an average thickness of 1 to 3 μm, the steel substrate includes a base steel sheet and the oxide layer arranged in contact with the base steel sheet, the base steel sheet includes, as a chemical composition, by mass %, 2.5 to 4.0% of Si, 0.05 to 1.0% of Mn, 0 to 0.01% of C, 0 to 0.005% of S+Se, 0 to 0.01% of sol.Al, 0 to 0.005% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, the base steel sheet and the oxide layer include, as a total chemical composition, by mass %, 0.008 to 0.025% of O, when a glow discharge spectroscopy is conducted in a region from a surface of the oxide layer to an inside of the base steel sheet, when a sputtering time at which a Fe emission intensity becomes a saturation value thereof on a depth profile is referred to as $Fe_{sat}$ in unit of seconds, a plateau region of a Fe emission intensity where a Fe emission intensity stays for $Fe_{sat}\times0.05$ seconds or more in a range of 0.20 to 0.80 times as compared with the saturation value is included between 0 second and the $Fe_{sat}$ on the depth profile, and when a sputtering time at which a Si emission intensity becomes a maximal value on the depth profile is referred to as $Si_{max}$ in unit of seconds, a maximal point of a Si emission intensity at which a Si emission intensity at the $Si_{max}$ becomes 0.15 to 0.50 times as compared with a Fe emission intensity at the $Si_{max}$ is included between the plateau region and the $Fe_{sat}$ on the depth profile.

(3) A producing method for a grain oriented electrical steel sheet according to an aspect of the present invention, the producing method for the grain oriented electrical steel sheet without a forsterite film includes a hot rolling process of heating and thereafter hot-rolling a steel piece to obtain a hot rolled steel sheet, a hot band annealing process of optionally annealing the hot rolled steel sheet to obtain a hot band annealed steel sheet, a cold rolling process of cold-rolling the hot rolled steel sheet or the hot band annealed steel sheet by cold-rolling once or by cold-rolling plural times with an intermediate annealing to obtain a cold rolled steel sheet, a decarburization annealing process of decarburization-annealing the cold rolled steel sheet to obtain a decarburization annealed steel sheet, a final annealing process of applying an annealing separator to the decarburization annealed steel sheet and thereafter final-annealing the decarburization annealed steel sheet to obtain a final annealed steel sheet, an oxidizing process of conducting a washing treatment, a pickling treatment, and a heat treatment in turn for the final annealed steel sheet to obtain an oxidized steel sheet, and an insulation coating forming process of applying a solution for forming a phosphate-silica mixed tension-insulation coating to a surface of the oxidized steel sheet and of baking the solution so as to form the tension-insulation coating with an average thickness of 1 to 3 μm, wherein, in the hot rolling process, the steel piece includes, as a chemical composition, by mass %, 2.5 to 4.0% of Si, 0.05 to 1.0% of Mn, 0.02 to 0.10% of C, 0.005 to 0.080% of S+Se, 0.01 to 0.07% of sol.Al, 0.005 to 0.020% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, and wherein, in the oxidizing process, as the washing treatment, a surface of the final annealed steel sheet is washed, as the pickling treatment, the final annealed steel sheet is pickled using a sulfuric acid of 2 to 20 mass % whose temperature is 70 to 90° C., and as the heat treatment, the final annealed steel sheet is held in a temperature range of 700 to 900° C. for 10 to 60 seconds in an atmosphere where an oxygen concentration is 5 to 21 volume % and a dew point is 10 to 30° C.

(4) In the producing method for the grain oriented electrical steel sheet according to (3), the producing method may further include, after the oxidizing process and before the insulation coating forming process, a second pickling process of pickling the oxidized steel sheet using a sulfuric acid of 1 to 5 mass % whose temperature is 70 to 90° C.

(5) In the producing method for the grain oriented electrical steel sheet according to (3) or (4), in the final annealing process, the annealing separator may include MgO, $Al_2O_3$, and a bismuth chloride.

(6) In the producing method for the grain oriented electrical steel sheet according to according to any one of (3) to (5), in the hot rolling process, the steel piece may include, as the chemical composition, by mass %, at least one selected from a group consisting of 0.0005 to 0.03% of Bi, 0.0005 to 0.03% of Te, and 0.0005 to 0.03% of Pb.

Effects of Invention

According to the above aspects of the present invention, it is possible to provide the grain oriented electrical steel sheet in which the adhesion of the tension-insulation coating is excellent and the iron loss characteristics are also excellent (the iron loss is low) even without the glass film (forsterite film). In addition, it is possible to provide the method for forming the above insulation coating and for producing the above grain oriented electrical steel sheet.

Specifically, according to the above aspects of the present invention, the glass film is not included, the formation of the intruding structure is suppressed, and thereby, the domain wall can easily move. In addition, the layering structure is controlled, the adhesion of the tension-insulation coating is ensured, and thereby, the sufficient tension can be imparted to the base steel sheet. As a result, it is possible to obtain the excellent magnetic characteristics as the grain oriented electrical steel sheet.

DETAILED DESCRIPTION OF PREFERRED EMBODIMENTS

Hereinafter, a preferred embodiment of the present invention is described in detail. However, the present invention is not limited only to the configuration which is disclosed in the present embodiment, and various modifications are possible without departing from the aspect of the present invention. In addition, the limitation range as described below includes a lower limit and an upper limit thereof. However, the value represented by "more than" or "less than" does not include in the limitation range. Unless otherwise noted, "%" of the chemical composition represents "mass %".

Moreover, in the embodiment and the drawings, duplicate explanations in regard to the component which has the substantial same function are omitted by adding the same reference sign.

The present inventors have made a thorough investigation to improve the adhesion of the tension-insulation coating for the grain oriented electrical steel sheet without the glass film (forsterite film). As a result, it has been found that, even without the glass film, the coating adhesion can be ensured by forming a favorable oxide layer, the favorable oxide layer being formed by the following treatments. Specifically, a final annealed steel sheet without the glass film after final annealing is subjected to washing treatment of washing a surface thereof, to pickling treatment using sulfuric acid, and then to heat treatment in predetermined atmosphere.

In addition, the present inventors have made a thorough investigation to improve the iron loss for the grain oriented electrical steel sheet without the glass film. As a result, it has been found that, when the oxides are excessively formed, the oxides remain excessively inside the grain oriented electrical steel sheet after applying and baking the tension-insulation coating, and thereby, the iron loss deteriorates. In order to improve the adhesion and the attained iron loss (the most favorable iron loss which is achieved) at the same time, it has been found that it is preferable to control oxygen content and Si concentrated layer before forming the tension-insulation coating. It has been found that, when the oxygen content and the Si concentrated layer are controlled, the Fe component in the tension-insulation coating is controlled, and as a result, the adhesion and the attained iron loss are improved at the same time.

<Main Features of Grain Oriented Electrical Steel Sheet>

Figure 1A:
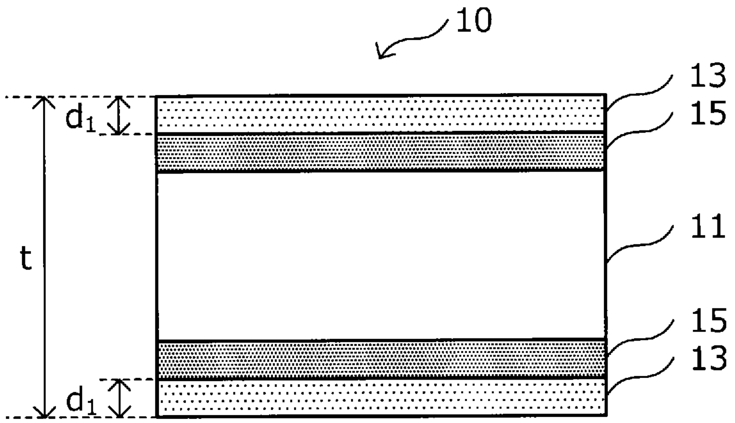
FIG. 1A is a cross-sectional illustration showing a grain oriented electrical steel sheet according to an embodiment of the present invention.
Figure 1B:
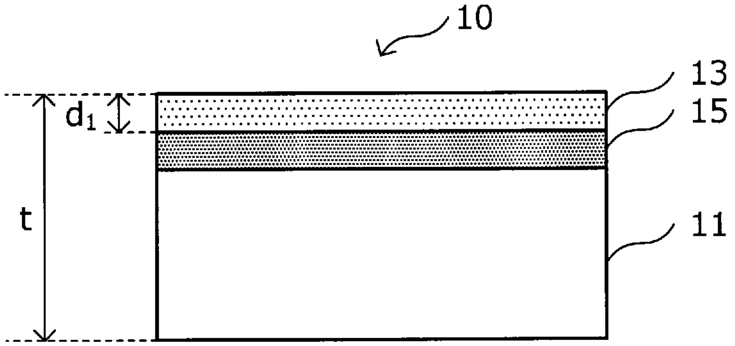
FIG. 1B is a cross-sectional illustration showing a modification of the grain oriented electrical steel sheet according to the embodiment.

The main features of the grain oriented electrical steel sheet according to the embodiment are described with reference to FIG. 1A and FIG. 1B. FIG. 1A and FIG. 1B are illustrations schematically showing the structure of grain oriented electrical steel sheet according to the embodiment.

As schematically shown in FIG. 1A, the grain oriented electrical steel sheet 10 according to the embodiment includes the base steel sheet 11, the oxide layer 15 arranged in contact with the base steel sheet 11, and the tension-insulation coating 13 arranged in contact with the oxide layer 15. In the grain oriented electrical steel sheet 10, the glass film (forsterite film) does not exist between the base steel sheet 11 and the tension-insulation coating 13. Moreover, in view of the analysis results of glow discharge spectroscopy (GDS), the oxide layer 15 includes specific oxides. In the grain oriented electrical steel sheet 10, the tension-insulation coating 13 and the oxide layer 15 are generally formed on both sheet surfaces of the base steel sheet 11 as schematically shown in FIG. 1A, but may be formed on at least one sheet surface of the base steel sheet 11 as schematically shown in FIG. 1B.

Hereinafter, the grain oriented electrical steel sheet 10 according to the embodiment is explained focusing on its characteristic features. In the following description, detailed description of known features and features which can be accomplished by the skilled person may be omitted.

(Base Steel Sheet 11)

The base steel sheet 11 is obtained by using steel piece with a predetermined chemical composition and applying predetermined production conditions, and thus, the chemical composition and the texture are controlled. The chemical composition of the base steel sheet 11 is described in detail below.

(Tension-Insulation Coating 13)

The tension-insulation coating 13 is arranged above the base steel sheet 11 (specifically, above the oxide layer 15 as explained below in detail). The tension-insulation coating 13 ensures the electrical insulation for the grain oriented electrical steel sheet 10, and thereby, the eddy current loss is reduced. As a result, the magnetic characteristics (specifically, the iron loss) is improved. In addition to the electrical insulation, the tension-insulation coating 13 improves corrosion resistance, heat resistance, slippage, and the like for the grain oriented electrical steel sheet 10.

Moreover, the tension-insulation coating 13 applies the tension to the base steel sheet 11. When the tension is applied to the base steel sheet 11, the magnetic domain wall motion becomes easier during the magnetization process, and thus, the iron loss characteristics of the grain oriented electrical steel sheet 10 are improved.

Moreover, the continuous wave laser beam or the electron beam may be irradiated on the surface of the tension-insulation coating 13, in order to refine the magnetic domain.

For instance, the tension-insulation coating 13 is formed by applying the insulation coating forming solution which mainly includes metal phosphate and colloidal silica to the surface of the oxide layer 15 arranged in contact with the base steel sheet 11 and by baking the above solution.

The average thickness of the tension-insulation coating 13 (the average thickness $d_1$ in FIG. 1A and FIG. 1B) is not particularly limited, but may be 1 to 3 μm, for instance. When the average thickness of the tension-insulation coating 13 is within the above range, it is possible to favorably improve various characteristics such as electrical insulation, corrosion resistance, heat resistance, slippage, tension imparting ability. The average thickness $d_1$ of the tension-insulation coating 13 is preferably 2.0 to 3.0 μm, and more preferably 2.5 to 3.0 μm.

Herein, the above average thickness $d_1$ of the tension-insulation coating 13 may be measured by electromagnetic coating thickness tester (for instance, LE-370 produced by Kett Electric Laboratory).

(Oxide Layer 15)

The oxide layer 15 is the oxide layer which acts as an intermediate layer between the base steel sheet 11 and the tension-insulation coating 13 in the grain oriented electrical steel sheet 10 according to the embodiment. The oxidation state of the oxide layer 15 is controlled as described below.

In the grain oriented electrical steel sheet 10 according to the embodiment, when $0.01<(Fe_{0.5}-Fe_{0.05})/Fe_{0.5}<0.35$ is satisfied as explained below, it is judged that the above oxide layer 15 is included. Herein, the grain oriented electrical steel sheet which includes the forsterite film and typical oxide layer does not satisfy the above conditions.

The oxide layer 15 mainly includes iron oxides such as magnetite ($Fe_3O_4$), hematite ($Fe_2O_3$), and fayalite ($Fe_2SiO_4$), and Si included oxides. In addition, the other oxides may be included. The existence of the oxide layer 15 can be confirmed by conducting the glow discharge spectroscopy (GDS) for the grain oriented electrical steel sheet 10.

The above various oxides are formed, for instance, by reacting oxygen with the surface of the final annealed steel sheet. The oxide layer 15 mainly includes the iron oxides and the Si included oxides, and thereby, the adhesion with the base steel sheet 11 is improved. In general, it is difficult to improve the adhesion between metals and ceramics. However, in the grain oriented electrical steel sheet 10 according to the embodiment, the oxide layer 15 is arranged between the base steel sheet 11 and the tension-insulation coating 13 which is a kind of ceramic, and thereby, it is possible to improve the adhesion of the tension-insulation coating 13 and to improve the iron loss characteristics.

The constituent phase in the oxide layer 15 is not particularly limited. As necessary, it is possible to identify the constituent phase by X-ray crystallography, X-ray photoelectron spectroscopy (XPS), Transmission Electron Microscope (TEM), or the like.

<Thickness of Grain Oriented Electrical Steel Sheet 10>

The average thickness of the grain oriented electrical steel sheet 10 according to the embodiment (the average thickness tin FIG. 1A and FIG. 1B) is not particularly limited, but may be 0.17 to 0.35 mm for instance.

<Chemical Composition of Base Steel Sheet 11>

The chemical composition of the base steel sheet 11 of the grain oriented electrical steel sheet 10 according to the embodiment is described in detail. Hereinafter, "%" of the amount of respective elements as described below expresses "mass %" unless otherwise mentioned.

In the grain oriented electrical steel sheet 10 according to the embodiment, the base steel sheet 11 includes, as the chemical composition, base elements, optional elements as necessary, and a balance consisting of Fe and impurities.

In the embodiment, the base steel sheet 11 includes Si and Mn as the base elements (main alloying elements).

(2.5 to 4.0% of Si)

Si (silicon) is an element which increases the electric resistance of steel and which reduces the eddy current loss. When the Si content is less than 2.5%, the above effect to reduce the eddy current loss is not sufficiently obtained. On the other hand, when the Si content is more than 4.0%, the cold workability of steel deteriorates. Thus, in the embodiment, the Si content of the base steel sheet 11 is to be 2.5 to 4.0%. The Si content is preferably 2.7% or more, and more preferably 2.8% or more. Moreover, the Si content is preferably 3.9% or less, and more preferably 3.8% or less.

(0.05 to 1.00% of Mn)

Mn (manganese) forms MnS and MnSe in the production processes by bonding to S and/or Se explained later. These precipitates act as the inhibitor (inhibitor of normal grain growth) and induce the secondary recrystallization in steel during final annealing. Moreover, Mn is an element which improves the hot workability of steel. When the Mn content is less than 0.05%, the above is not sufficiently obtained. On the other hand, when the Mn content is more than 1.00%, the secondary recrystallization does not occur and the magnetic characteristics of steel deteriorate. Thus, in the embodiment, the Mn content of the base steel sheet 11 is to be 0.05 to 1.00%. The Mn content is preferably 0.06% or more. Moreover, the Mn content is preferably 0.50% or less.

In the embodiment, the base steel sheet 11 may include the impurities. The impurities correspond to elements which are contaminated during industrial production of steel from ores and scrap that are used as a raw material of steel, or from environment of a production process.

Moreover, in the embodiment, the base steel sheet 11 may include the optional elements in addition to the base elements and the impurities. For example, as substitution for a part of Fe which is the balance, the silicon steel sheet may include the optional elements such as C, S, Se, sol. Al (acid-soluble Al), N, Bi, Te, Pb, Sb, Sn, Cr, and Cu. The optional elements may be included as necessary. Thus, a lower limit of the respective optional elements does not need to be limited, and the lower limit may be 0%. Moreover, even if the optional elements may be included as impurities, the above mentioned effects are not affected.

(O to 0.01% of C)

C (carbon) is an optional element. C is the element effective for microstructure control until the completion of the decarburization annealing process in the production processes, and thereby, the magnetic characteristics for the grain oriented electrical steel sheet are improved. However, as the final product, when the C content of the base steel sheet 11 is more than 0.01%, the magnetic characteristics for the grain oriented electrical steel sheet 10 deteriorate. Thus, in the embodiment, the C content of the base steel sheet 11 is to be 0.01% or less. The C content is preferably 0.005% or less. On the other hand, the lower limit of the C content of the base steel sheet 11 is not particularly limited, but may be 0%. It is preferable that the C content is as low as possible. However, even when the C content is reduced to less than 0.0001%, the effect for the microstructure control is saturated, and the producing cost increases. Thus, the C content is preferably 0.0001% or more.

(0 to 0.005% in Total of S+Se)

S (sulfur) and Se (selenium) are optional elements. S and Se form MnS and MnSe which act as the inhibitor by bonding to Mn in the production processes. However, when the total amount of S and Se of the base steel sheet 11 is more than 0.005%, the inhibitor remains in the base steel sheet 11, and the magnetic characteristics deteriorate. Thus, in the embodiment, the total amount of S and Se of the base steel sheet 11 is to be 0.005% or less. On the other hand, the lower limit of the total amount of S and Se of the base steel sheet 11 is not particularly limited, but may be 0%. It is preferable that the total amount of S and Se is as low as possible. However, even when the total amount of S and Se is reduced to less than 0.0001%, the producing cost increases. Thus, the total amount of S and Se is preferably 0.0001% or more.

(0 to 0.01% of sol.Al)

Sol. Al (acid soluble Al) is an optional element. Al forms AlN which acts as the inhibitor by bonding to N in the production processes. However, when the sol.Al content is more than 0.01%, the inhibitor excessively remains in the base steel sheet 11, and the magnetic characteristics deteriorate. Thus, in the embodiment, the sol.Al content of the base steel sheet 11 is to be 0.01% or less. The sol.Al content is preferably 0.005% or less, and more preferably 0.004% or less. The lower limit of the sol.Al content of the base steel sheet 11 is not particularly limited, but may be 0%. However, in order to reduce the sol.Al content to less than 0.0001%, the producing cost increases. Thus, the sol.Al content is preferably 0.0001% or more.

(0 to 0.005% of N)

N (nitrogen) is an optional element. N forms AlN which acts as the inhibitor by bonding to Al in the production processes. However, when the N content is more than 0.005%, the inhibitor excessively remains in the base steel sheet 11, and the magnetic characteristics deteriorate. Thus, in the embodiment, the N content of the base steel sheet 11 is to be 0.005% or less. The N content is preferably 0.004% or less. The lower limit of the N content of the base steel sheet 11 is not particularly limited, but may be 0%. However, in order to reduce the N content to less than 0.0001%, the producing cost increases. Thus, the N content is preferably 0.0001% or more.

(0 to 0.03% of Bi)

(0 to 0.03% of Te)

(0 to 0.03% of Pb)

Bi (bismuth), Te (tellurium), and Pb (lead) are optional elements. When the amount of each of these elements included in the base steel sheet 11 is 0.03% or less, it is possible to favorably improve the magnetic characteristics for the grain oriented electrical steel sheet 10. However, when the amount of each of these elements is more than 0.03% respectively, the steel sheet may become brittle in the higher temperature range. Thus, in the embodiment, the amount of each of these elements included in the base steel sheet 11 is to be 0.03% or less. The lower limit of the amount of each of these elements included in the base steel sheet 11 is not particularly limited, but may be 0%. The lower limit of the amount of each of these elements may be 0.0001%.

(0 to 0.50% of Sb)

(0 to 0.50% of Sn)

(0 to 0.50% of Cr)

(0 to 1.0% of Cu)

Sb (antimony), Sn (tin), Cr (chrome), and Cu (copper) are optional elements. When these elements are included in the base steel sheet 11, it is possible to favorably improve the magnetic characteristics for the grain oriented electrical steel sheet 10. Thus, in the embodiment, it is preferable to control the amount of each of these elements included in the base steel sheet 11 to 0.50% or less of Sb, 0.50% or less of Sn, 0.50% or less of Cr, and 1.0% or less of Cu. The lower limit of the amount of each of these elements included in the base steel sheet 11 is not particularly limited, but may be 0%. In order to favorably obtain the above effect, the amount of each of these elements is preferably 0.0005% or more, and more preferably 0.001% or more.

Herein, at least one of Sb, Sn, Cr, and Cu may be included in the base steel sheet 11. Specifically, the base steel sheet 11 may be include at least one of 0.0005 to 0.50% of Sb, 0.0005 to 0.50% of Sn, 0.0005 to 0.50% of Cr, and 0.0005 to 1.0% of Cu.

In the grain oriented electrical steel sheet, the chemical composition changes relatively drastically (the amount of alloying element decreases) through the decarburization annealing and through the purification annealing during secondary recrystallization. Depending on the element, the amount of the element may decreases through the purification annealing to an undetectable level (1 ppm or less) using the typical analysis method. The above mentioned chemical composition is the chemical composition as the final product (the base steel sheet 11 of the grain oriented electrical steel sheet 10). In general, the chemical composition of the final product is different from the chemical composition of the steel piece (slab) as the starting material.

The chemical composition of the base steel sheet 11 of the grain oriented electrical steel sheet 10 may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Specifically, it is possible to obtain the chemical composition by conducting the measurement by Shimadzu ICPS-8100 and the like (measurement device) under the condition based on calibration curve prepared in advance using samples with 35 mm square taken from the base steel sheet 11. In addition, C and S may be measured by the infrared absorption method after combustion, and N may be measured by the thermal conductometric method after fusion in a current of inert gas.

The above chemical composition is the composition of the base steel sheet 11 of the grain oriented electrical steel sheet 10. When the grain oriented electrical steel sheet 10 used as the measurement sample has the tension-insulation coating 13 and the oxide layer 15 on the surface thereof, the chemical composition is measured after removing the coating and the like by the typical methods.

<Analysis by Glow Discharge Spectroscopy>

In the grain oriented electrical steel sheet 10 according to the embodiment, the oxide layer 15 is arranged between the base steel sheet 11 and the tension-insulation coating 13, and thereby, the oxide layer 15, the tension-insulation coating 13, and the base steel sheet 11 adhere tightly, even without the glass film (forsterite film).

It is possible to judge whether or not the oxide layer 15 is included in the grain oriented electrical steel sheet 10 by the analysis using the glow discharge spectroscopy. Specifically, the glow discharge spectroscopy is conduced, and then, the GDS depth profile may be confirmed. Hereinafter, the GDS depth profile is explained in detail with reference to FIG. 2 and FIG. 3.

Figure 2:
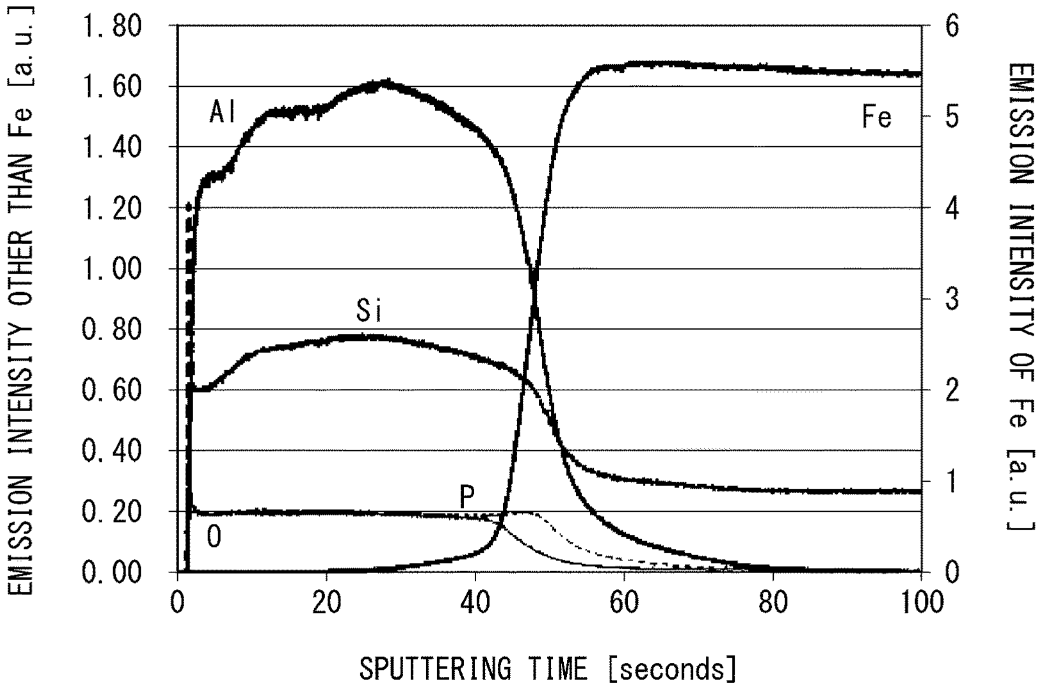
FIG. 2 is an instance of GDS depth profile of the grain oriented electrical steel sheet according to the embodiment.
Figure 3:
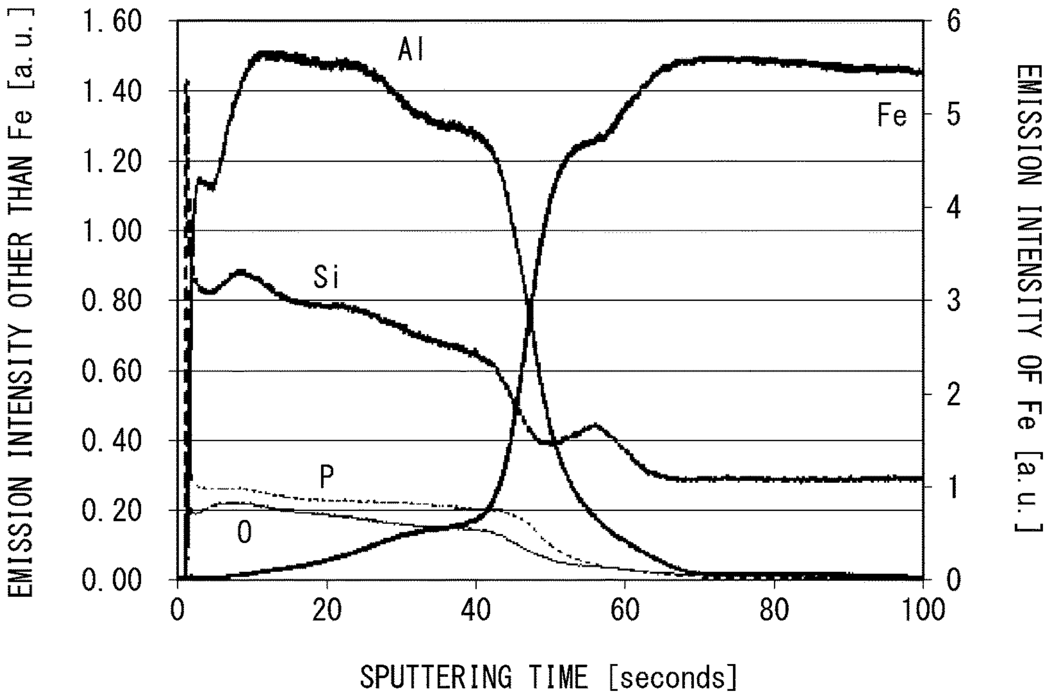
FIG. 3 is an instance of GDS depth profile of the grain oriented electrical steel sheet different from the embodiment.

FIG. 2 is an instance of the GDS depth profile of the grain oriented electrical steel sheet 10 according to the embodiment. FIG. 2 is the GDS depth profile obtained by conducting the glow discharge spectroscopy in the region from the surface of the tension-insulation coating 13 to the inside of the base steel sheet 11. FIG. 3 is an instance of the GDS depth profile of the grain oriented electrical steel sheet which does not include the forsterite film but is different from the grain oriented electrical steel sheet according to the embodiment. FIG. 3 is also the GDS depth profile obtained by conducting the glow discharge spectroscopy in the region from the surface of the tension-insulation coating to the inside of the base steel sheet.

For both grain oriented electrical steel sheets of FIG. 2 and FIG. 3, the tension-insulation coating which is based on phosphate-silica mixture which mainly includes aluminum phosphate and colloidal silica and includes Cr has been formed. In the GDS depth profiles shown as FIG. 2 and FIG. 3, the GDS analysis has been conducted from the surface of the grain oriented electrical steel sheet to approximately 4 to 8 μm in depth.

GDS is a method of measuring an amount of target element at each position in the thickness direction of the measured sample while sputtering the surface of the measured sample. The horizontal axis of FIG. 2 and FIG. 3 corresponds to the sputtering time (seconds) (in other words, elapsed time from starting the measurement), and the position at which the sputtering time is 0 second corresponds to the surface position of the grain oriented electrical steel sheet to be measured. The vertical axis of FIG. 2 and FIG. 3 corresponds to the emission intensity (a.u.) of each element.

First, in FIG. 2 and FIG. 3, attention is directed to a region from the sputtering start until the emission intensity derived from Fe (hereinafter, referred to as Fe emission intensity) starts to remarkably increase (in FIG. 2 and FIG. 3, the region where the sputtering time is approximately 0 to 40 seconds). As clearly shown in FIG. 2, in the region, the emission peak derived from Al is noticeably detected. Moreover, it seems that the emission intensities derived from Si and P decrease gradually, and the emission peaks which are gently and broadly distributed are exist. It seems that Al, Si, and P detected in the region are originated from the aluminum phosphate and the colloidal silica which are used for the tension-insulation coating. Thus, the region until the Fe emission intensity starts to remarkably increase (the region where the sputtering time is 0 to 40 seconds in FIG. 2) can be regarded as the tension-insulation coating in the layering structure of the grain oriented electrical steel sheet. A region where the sputtering time is longer than that of the above region can be regarded as the oxide layer and the base steel sheet.

Moreover, the Fe emission intensity shows a profile such that the Fe emission intensity starts to gradually increase from the surface vicinity of the grain oriented electrical steel sheet (the position at which the sputtering time is approximately 0 second in FIG. 2), starts to remarkably increase from a certain position (the position at which the sputtering time is approximately 40 seconds in FIG. 2), and thereafter, saturates to a certain value. It seems that Fe detected in the profile is mainly originated from the base steel sheet. Thus, a region where the Fe emission intensity is saturated can be regarded as the base steel sheet in the layering structure of the grain oriented electrical steel sheet.

In the embodiment, a position (sputtering time) at which the Fe emission intensity becomes 0.05 times as compared with the Fe emission intensity of the base steel sheet (i.e. the saturation value of the Fe emission intensity) on the depth profile is regarded as a position at which the Fe content starts to increase in the tension-insulation coating 13 and the oxide layer 15, and the sputtering time is expressed as "$Fe_{0.05}$" in unit of seconds.

Moreover, an interface between the oxide layer 15 and the base steel sheet 11 is rarely horizontal. In the embodiment, a position (sputtering time) at which the Fe emission intensity becomes 0.5 times as compared with the Fe emission intensity of the base steel sheet (i.e. the saturation value of the Fe emission intensity) on the depth profile is regarded as the interface between the oxide layer 15 and the base steel sheet 11, and the sputtering time is expressed as "$Fe_{0.5}$" in unit of seconds.

Moreover, the value "$(Fe_{0.5}-Fe_{0.05})$" can be regarded as a region (thickness) where the Fe content is high in the tension-insulation coating 13 and the oxide layer 15. Thus, the value "$(Fe_{0.5}-Fe_{0.05})/Fe_{0.5}$" corresponds to the ratio of the thickness where the Fe content is high to the total thickness of the tension-insulation coating 13 and the oxide layer 15.

In the grain oriented electrical steel sheet 10 according to the embodiment, the $Fe_{0.5}$ and the $Fe_{0.05}$ satisfy the following (formula 101).

$$0.01<(Fe_{0.5}-Fe_{0.05})/Fe_{0.5}<0.35 \quad \text{(formula 101)}$$

In the grain oriented electrical steel sheet 10 according to the embodiment, by including the oxide layer 15 satisfying the above (formula 101), the coating adhesion is improved and the attained iron loss (the most favorable iron loss which is achieved) is reduced. The reason why the above effect is obtained is not clear at present. However, it seems that, when the oxides are excessively formed, the oxides remain excessively inside the grain oriented electrical steel sheet after applying and baking the tension-insulation coating, and thereby, the iron loss deteriorates. Thus, it seems that, when the formation of the oxides is controlled, the oxide layer 15 satisfying the above (formula 101) is formed, and thereby, the above effect is obtained. Herein, in the grain oriented electrical steel sheet 10 according to the embodiment, the appearance becomes light gray due to the above structure.

On the other hand, FIG. 3 is the GDS depth profile of the grain oriented electrical steel sheet which does not include the forsterite film but is different from to the embodiment. The GDS depth profile of FIG. 3 is quite different from the GDS depth profile of FIG. 2. Moreover, in the GDS depth profile of FIG. 3, the above (formula 101) is not satisfied. In the grain oriented electrical steel sheet in regard to FIG. 3, the appearance becomes dark brown.

Herein, the value "$(Fe_{0.5}-Fe_{0.05})/Fe_{0.5}$" is preferably 0.25 or less, more preferably 0.24 or less, and further more preferably 0.23 or less. At this time, the attained iron loss is improved. Moreover, the value "$(Fe_{0.5}-Fe_{0.05})/Fe_{0.5}$" is preferably 0.02 or more.

GDS is a method of analyzing an area of approximately 4 mm diameter with sputtering. Thus, it seems that the GDS depth profile expresses average behavior of each element in the area which is approximately 4 mm diameter in sample. Moreover, the grain oriented electrical steel sheet may be coiled into a coil shape, and it is considered that the GDS depth profiles are the substantial same at any points in width direction in so far as the points are certain distance away from the head of the coil. Moreover, when the substantial same GDS depth profiles are obtained at both the head and tail of the coil, it is considered that the substantial same GDS depth profiles are obtained in the whole coil.

GDS is conducted in a region from a surface of the tension-insulation coating to an inside of the base steel sheet. The conditions for GDS analysis may be as follows. The measurement may be conducted under conditions such that output is 30 W, Ar pressure is 3 hPa, measurement area is 4 mm diameter, and measurement time is 100 seconds in high frequency mode using a typical glow discharge spectrum analyzer (for instance, GDA750 produced by Rigaku Corporation).

Herein, it is preferable to judge the above (formula 101) after smoothing the measured GDS depth profile. In order to smooth the GDS depth profile, for instance, a simple moving average method may be used. Moreover, the sputtering time at which the Fe emission intensity becomes the saturation value may be specified as 100 seconds for instance.

<Forsterite Film>

The grain oriented electrical steel sheet 10 according to the embodiment does not include the forsterite film. In the embodiment, it may be judged by the following procedure whether or not the grain oriented electrical steel sheet 10 includes the forsterite film.

Whether or not the grain oriented electrical steel sheet 10 includes the forsterite film may be confirmed by X-ray diffraction method. For instance, the X-ray diffraction may be conducted for the surface after removing the tension-insulation coating 13 and the like from the grain oriented electrical steel sheet 10, and the obtained X-ray diffraction spectrum may be collated with PDF (Powder Diffraction File). The forsterite ($Mg_2SiO_4$) may be identified by JCPDS No. 34-189. In the embodiment, when the main constituent phase in the above X-ray diffraction spectrum is not the forsterite, the grain oriented electrical steel sheet 10 is judged not to include the forsterite film.

In order to only remove the tension-insulation coating 13 from the grain oriented electrical steel sheet 10, the grain oriented electrical steel sheet 10 with the coating may be immersed in hot alkaline solution. Specifically, it is possible to remove the tension-insulation coating 13 and the like from the grain oriented electrical steel sheet 10 by immersing the steel sheet in sodium hydroxide aqueous solution which includes 30 mass % of NaOH and 70 mass % of $H_2O$ at 80° C. for 20 minutes, washing it with water, and then by drying it. In general, only insulation coating is removed by the alkaline solution, and the forsterite film is removed by the acidic solution such as hydrochloric acid. Thus, in a case where the forsterite film is included, by immersing in the above alkaline solution, the tension-insulation coating 13 is removed, and the forsterite film is exposed.

<Magnetic Characteristics>

The magnetic characteristics of the grain oriented electrical steel sheet may be measured on the basis of the epstein test regulated by JIS C2550: 2011, the single sheet tester (SST) method regulated by JIS C 2556: 2015, and the like. In the grain oriented electrical steel sheet 10 according to the embodiment, the magnetic characteristics may be evaluated by adopting the single sheet tester method regulated by JIS C 2556: 2015 among the above methods.

In the grain oriented electrical steel sheet 10 according to the embodiment, the average magnetic flux density B8 in the rolling direction (the magnetic flux density under the magnetizing field of 800 A/m) may be 1.90 T or more. The upper limit of the magnetic flux density is not particularly limited, but may be 2.02 T for instance.

When a steel ingot is formed in vacuum furnace and the like for the research and development, it is difficult to take a test piece with the same size as that industrially produced. In the case, for instance, the test piece with a width of 60 mm and a length of 300 mm may be taken, and the measurement may be conducted in accordance with the single sheet tester method. Moreover, the measured value may be multiplied by the correction factor in order to obtain the measured value equivalent to that based on the epstein test. In the embodiment, the measurement is conducted in accordance with the single sheet tester method.

<Forming Method for Insulation Coating of Grain Oriented Electrical Steel Sheet>

Next, a forming method for the insulation coating of the grain oriented electrical steel sheet according to a preferred embodiment of the present invention is described. The forming method for the insulation coating of the grain oriented electrical steel sheet according to the embodiment includes the insulation coating forming process. In the insulation coating forming process, the solution for forming the tension-insulation coating is applied to a steel substrate, and the solution is baked, in order to form the tension-insulation coating.

Figure 4:
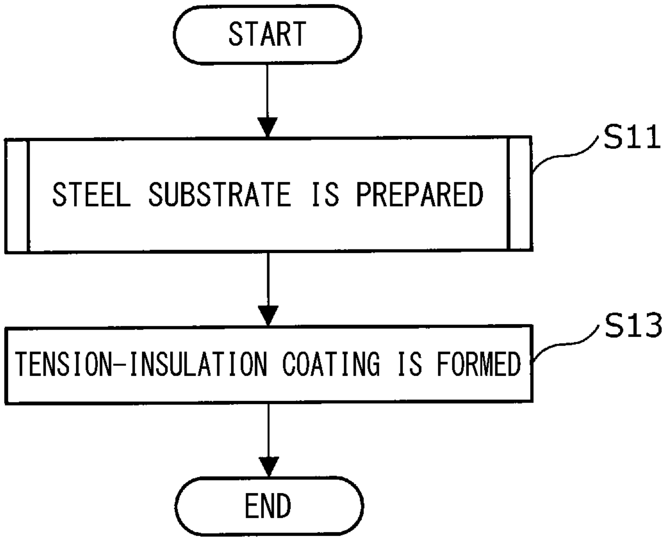
FIG. 4 is a flow chart illustrating a forming method for an insulation coating of a grain oriented electrical steel sheet according to an embodiment of the present invention.

FIG. 4 is a flow chart illustrating an instance of the forming method for the insulation coating of the grain oriented electrical steel sheet according to the embodiment. As shown in FIG. 4, in the forming method for the insulation coating of the grain oriented electrical steel sheet according to the embodiment, the steel substrate which does not include the forsterite film is prepared (step S11), and the tension-insulation coating is formed on a surface of the steel substrate (step S13). The step S13 corresponds to the insulation coating forming process.

The above steel substrate includes the base steel sheet and the oxide layer arranged in contact with the base steel sheet. The steel substrate does not include the glass film (forsterite film).

The base steel sheet of the steel substrate includes, as the chemical composition, by mass %, 2.5 to 4.0% of Si,
0.05 to 1.0% of Mn,
0 to 0.01% of C,
0 to 0.005% of S+Se,
0 to 0.01% of sol.Al,
0 to 0.005% of N,
0 to 0.03% of Bi,
0 to 0.03% of Te,
0 to 0.03% of Pb,
0 to 0.50% of Sb,
0 to 0.50% of Sn,
0 to 0.50% of Cr,
0 to 1.0% of Cu, and
a balance consisting of Fe and impurities.

The above chemical composition of the base steel sheet is identical to the chemical composition of the base steel sheet 11 explained above, and thus, the detail explanation is omitted.

In addition, the base steel sheet and the oxide layer in the steel substrate include, as a total chemical composition, by mass %, 0.008 to 0.025% of O.

The oxide layer of the steel substrate includes a layer including mainly iron oxides and a Si included oxide layer. The oxide layer is not the forsterite film. The details are explained below.

The steel substrate which is utilized for the forming method for the insulation coating of the grain oriented electrical steel sheet according to the embodiment satisfies the following conditions (I) and (II). Herein, the steel substrate which includes the forsterite film and typical steel substrate do not satisfy the conditions.

(I) When a glow discharge spectroscopy is conducted in a region from a surface of the oxide layer to an inside of the base steel sheet, when a sputtering time at which a Fe emission intensity becomes a saturation value thereof on a depth profile is referred to as $Fe_{sat}$ in unit of seconds, a plateau region of a Fe emission intensity where a Fe emission intensity stays for $Fe_{sat}\times0.05$ seconds or more in a range of 0.20 to 0.80 times as compared with the saturation value is included between 0 second and the $Fe_{sat}$ on the depth profile.

(II) When a sputtering time at which a Si emission intensity becomes a maximal value on the depth profile is referred to as $Si_{max}$ in unit of seconds, a maximal point of a Si emission intensity at which a Si emission intensity at the $Si_{max}$ becomes 0.15 to 0.50 times as compared with a Fe emission intensity at the $Si_{max}$ is included between the plateau region and the $Fe_{sat}$ on the depth profile.

Figure 5:
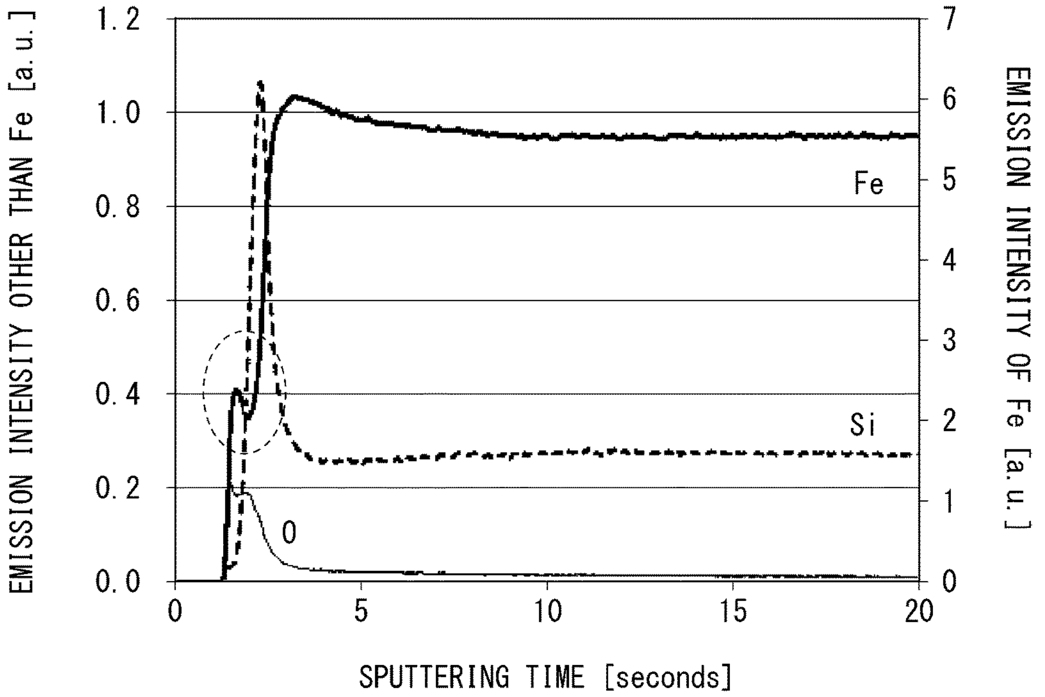
FIG. 5 is an instance of GDS profile of a steel substrate to be used in the forming method for the insulation coating of the grain oriented electrical steel sheet according to the embodiment.

FIG. 5 is an instance of GDS depth profile of a steel substrate to be used in the forming method for the insulation coating of the grain oriented electrical steel sheet according to the embodiment. FIG. 5 is the GDS depth profile obtained by conducting the glow discharge spectroscopy in the region from the surface of the oxide layer to the inside of the base steel sheet. In the GDS depth profile of FIG. 5, 20 seconds of the sputtering time corresponds to approximately 1.0 to 2.0 μm in depth from the surface of the grain oriented electrical steel sheet. In FIG. 5, the horizontal axis corresponds to the sputtering time (seconds), and the vertical axis corresponds to the emission intensity (a.u.) of each element.

In FIG. 5, the Fe emission intensity shows a profile such that the Fe emission intensity starts to remarkably increase with starting the sputtering, becomes substantially horizontal (plateau) for a short time shown as a region surrounded by a broken line in the figure, starts to increase again, and thereafter, saturates to a certain value. A region where the Fe emission intensity is saturated can be regarded as the base steel sheet in the layering structure of the steel substrate. Moreover, the region (plateau region) surrounded by the broken line in FIG. 5 can be regarded as a region including mainly iron oxides in the oxide layer of the steel substrate, because the O (oxygen) emission intensity is detected in the sputtering time which is identical to that of the above region.

In a region where the sputtering time is longer than that of the above plateau region, the Si emission intensity shows a maximal point (at near 3 seconds of the sputtering time), and thereafter, gradually approaches a certain value. The asymptotic value of Si can be regarded as the value corresponding to the Si content of the base steel sheet.

A region where the Si emission intensity shows the maximal point can be regarded as the Si included oxide layer in the oxide layer of the steel substrate, because Si and O are detected. The existence of the above maximal point of the Si emission intensity indicates that the Si concentrated layer is included in the oxide layer.

It is confirmed from the GDS depth profile of FIG. 5 that the steel substrate to be used in the forming method for the insulation coating according to the embodiment includes, from the surface thereof, the layer including mainly iron oxides, the Si included oxide layer, and the base steel sheet. In the embodiment, the layer including mainly iron oxides and the Si included oxide layer are collectively regarded as the oxide layer.

In the embodiment, the steel substrate which includes the above chemical composition and satisfies the above conditions (I) and (II) is subjected to the insulation coating forming process. As a result, the grain oriented electrical steel sheet 10 which shows the GDS depth profile such as FIG. 2 is produced.

Moreover, with respect to the maximal point of the Si emission intensity which is included between the plateau region and the $Fe_{sat}$ on the depth profile, the Si emission intensity is preferably 0.16 times or more and more preferably 0.17 times or more as compared with the Fe emission intensity at the $Si_{max}$. The value is preferably 0.48 times or less and more preferably 0.45 times or less.

Figure 6:
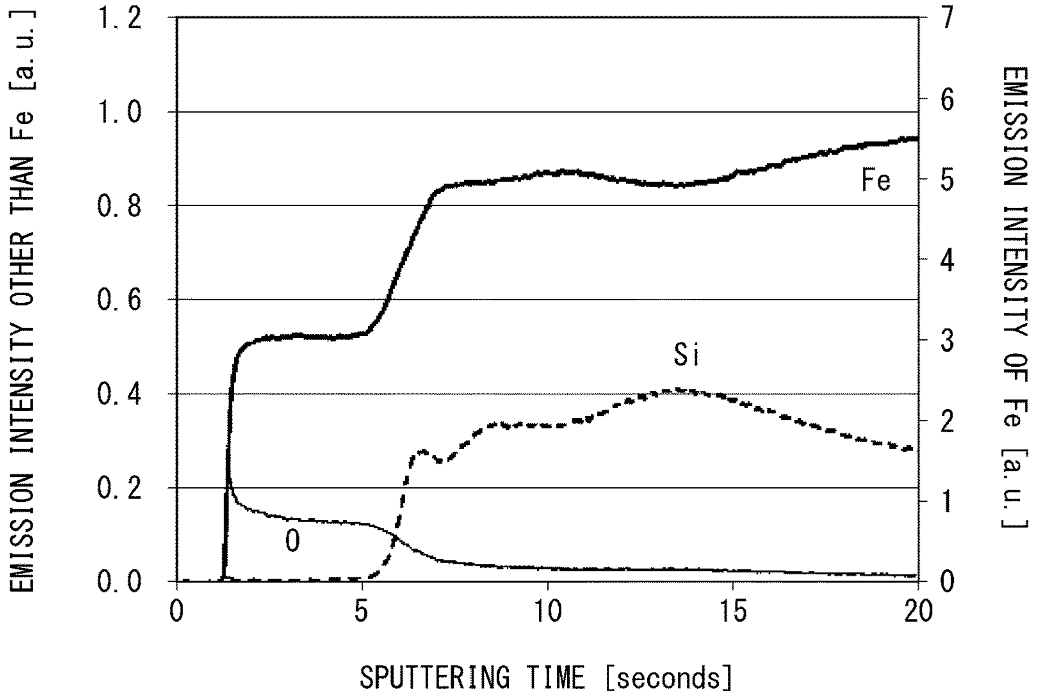
FIG. 6 is an instance of GDS profile of a steel substrate not to be used in the forming method for the insulation coating of the grain oriented electrical steel sheet according to the embodiment.

On the other hand, FIG. 6 is the GDS depth profile of the steel substrate which does not include the forsterite film but is different from to the steel substrate to be used for the embodiment. The GDS depth profile of FIG. 6 is quite different from the GDS depth profile of FIG. 5. Moreover, in the GDS depth profile of FIG. 6, the maximal point of the Si emission intensity is not included, and the above conditions (I) and (II) are not satisfied.

Herein, the conditions for GDS analysis, the method for analyzing data, and the method for judging the presence of the forsterite film are as described above.

In addition, in the steel substrate to be used in the forming method for the insulation coating according to the embodiment, the oxygen content in total of the base steel sheet and the oxide layer is 0.008 to 0.025 mass %. When the oxygen content is less than 0.008 mass %, it is difficult to obtain the grain oriented electrical steel sheet satisfying the above (formula 101). The oxygen content is preferably 0.009 mass % or more. On the other hand, when the oxygen content is more than 0.025 mass %, the oxides are excessively formed, the oxides remain excessively inside the grain oriented electrical steel sheet after applying and baking the tension-insulation coating, and thereby, the attained iron loss (the most favorable iron loss which is achieved) deteriorates. The oxygen content is preferably 0.023 mass % or less, and more preferably 0.020 mass % or less.

The above oxygen content may be measured by typical methods. For instance, the oxygen content may be measured by the non-dispersive infrared absorption method after fusion in a current of inert gas. In the method, test piece is put in a graphite crucible, the test piece is heated and fused in an inert gas atmosphere, and then, the carbon monoxide which is formed by reacting the oxygen in the test piece and the crucible and the carbon dioxide are quantitatively measured by an infrared detector.

In the forming method for the insulation coating according to the embodiment, by using the steel substrate satisfying the above conditions, not only the coating adhesion is improved, but also excellent attained iron loss is obtained stably. The reason why the above effect is obtained is not clear at present. However, it seems that, when the steel substrate satisfies the above conditions, the internally oxidized layer which is formed during forming the tension-insulation coating is favorably controlled, and as a result, domain wall motion becomes easy.

The solution for forming the phosphate-silica mixed tension-insulation coating is applied to the oxide layer of the steel substrate which includes the above chemical composition and satisfies the above conditions (I) and (II) and the solution is baked so as to form the tension-insulation coating with an average thickness of 1 to 3 μm. The solution may be applied to both sheet surfaces or one sheet surface of the steel substrate.

The conditions in the insulation coating forming process are not particularly limited. Known solution for forming the phosphate-silica mixed tension-insulation coating may be used, and the solution may applied and baked by known method. For instance, the solution is applied, and thereafter, is held at 850 to 950° C. for 10 to 60 seconds. The tension-insulation coating is formed on the steel substrate, and thereby, it is possible to further improve the magnetic characteristics of the grain oriented electrical steel sheet.

Herein, before applying the solution, the surface of the steel substrate to form the insulation coating may be subjected to optional pretreatment such as degreasing treatment with alkaline, pickling treatment with hydrochloric acid, sulfuric acid, phosphoric acid, and the like. The pretreatment may not be conducted.

The tension-insulation coating is not particularly limited, and known coating may be adopted. For instance, the tension-insulation coating may mainly include inorganics and may further include organics. The tension-insulation coating may mainly include metal phosphate and colloidal silica, and fine particles of organic resin may be dispersed in the tension-insulation coating.

Moreover, following the insulation coating forming process, the flattening annealing may be conducted for straightening. By conducting the flattening annealing for the grain oriented electrical steel sheet after the insulation coating forming process, it is possible to favorably reduce the iron loss characteristics.

Moreover, the magnetic domain refining treatment may be conducted for the produced grain oriented electrical steel sheet. Herein, the magnetic domain refining treatment is the treatment such that the laser beam which refines the magnetic domain is irradiated to the surface of the grain oriented electrical steel sheet or the groove is formed on the surface of the grain oriented electrical steel sheet. By conducting the magnetic domain refining treatment, it is possible to favorably reduce the magnetic characteristics.

<Producing Method for Grain Oriented Electrical Steel Sheet>

Figure 7:
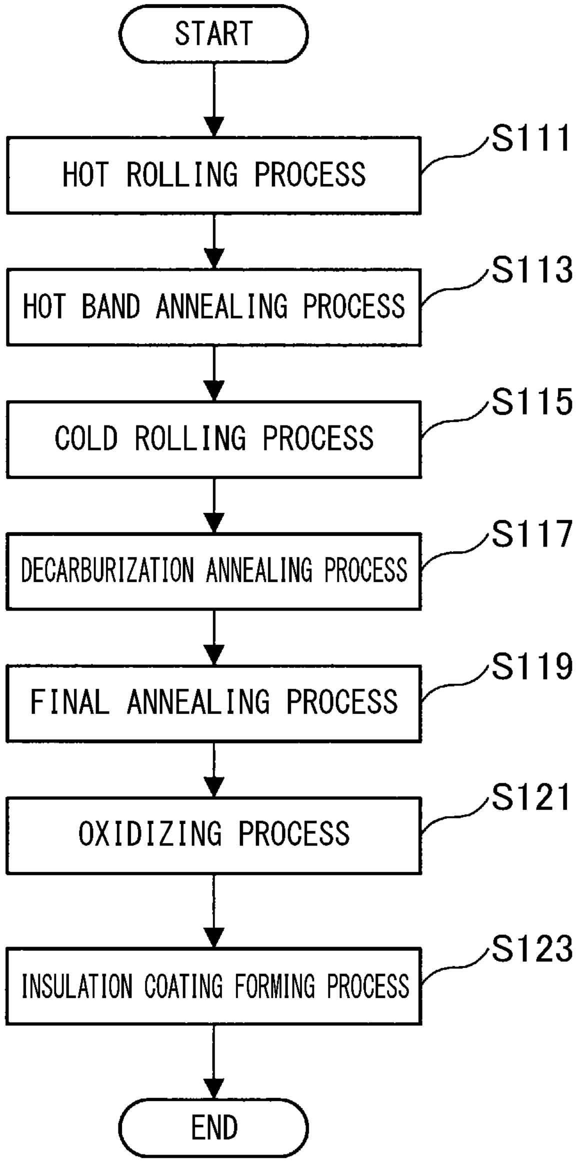
FIG. 7 is a flow chart illustrating a producing method for a grain oriented electrical steel sheet according to an embodiment of the present invention.

Next, a producing method for the grain oriented electrical steel sheet according to a preferred embodiment of the present invention is described in detail with reference to FIG. 7. FIG. 7 is a flow chart illustrating an instance of the producing method for the grain oriented electrical steel sheet according to the embodiment.

Herein, the producing method for the grain oriented electrical steel sheet 10 is not limited to the following method. The following method is just an instance for producing the grain oriented electrical steel sheet 10.

<Overall Flow of Producing Method for Grain Oriented Electrical Steel Sheet>

The producing method for the grain oriented electrical steel sheet according to the embodiment is for producing the grain oriented electrical steel sheet without the forsterite film, and the overall flow thereof is as follows.

The producing method for the grain oriented electrical steel sheet according to the embodiment includes the following processes, which are shown in FIG. 7.

(S111) Hot rolling process of heating and thereafter hot-rolling a steel piece (slab) including predetermined chemical composition to obtain a hot rolled steel sheet.

(S113) Hot band annealing process of optionally annealing the hot rolled steel sheet to obtain a hot band annealed steel sheet.

(S115) Cold rolling process of cold-rolling the hot rolled steel sheet or the hot band annealed steel sheet by cold-rolling once or by cold-rolling plural times with an intermediate annealing to obtain a cold rolled steel sheet.

(S117) Decarburization annealing process of decarburization-annealing the cold rolled steel sheet to obtain a decarburization annealed steel sheet.

(S119) Final annealing process of applying an annealing separator to the decarburization annealed steel sheet and thereafter final-annealing the decarburization annealed steel sheet to obtain a final annealed steel sheet.

(S121) Oxidizing process of conducting a washing treatment, a pickling treatment, and a heat treatment in turn for the final annealed steel sheet to obtain an oxidized steel sheet.

(S123) Insulation coating forming process of applying the solution for forming the tension-insulation coating to a surface of the oxidized steel sheet and of baking the solution.

The above processes are respectively described in detail. In the following description, when the conditions of each process are not described, known conditions may be appropriately applied.

<Hot Rolling Process>

The hot rolling process (step S111) is the process of heating and thereafter hot-rolling the steel piece (for instance, steel ingot such as slab) including predetermined chemical composition to obtain the hot rolled steel sheet. In the hot rolling process, the steel piece is heat-treated. The heating temperature of the steel piece is preferably in the range of 1200 to 1400° C. The heating temperature of the steel piece is preferably 1250° C. or more, and preferably 1380° C. or more. Subsequently, the heated steel piece is hot-rolled to obtain the hot rolled steel sheet. The average thickness of the hot rolled steel sheet is preferably in the range of 2.0 to 3.0 mm for instance.

In the producing method for the grain oriented electrical steel sheet according to the embodiment, the steel piece includes, as the chemical composition, base elements, optional elements as necessary, and a balance consisting of Fe and impurities. Hereinafter, "%" of the amount of respective elements as described below expresses "mass %" unless otherwise mentioned.

In the producing method for the grain oriented electrical steel sheet according to the embodiment, the steel piece (slab) includes Si, Mn, C, S+Se, sol. Al, and N as the base elements (main alloying elements).

(2.5 to 4.0% of Si)

Si is the element which increases the electric resistance of steel and which reduces the eddy current loss. When the Si content of the steel piece is less than 2.5%, the above effect to reduce the eddy current loss is not sufficiently obtained. On the other hand, when the Si content of the steel piece is more than 4.0%, the cold workability of steel deteriorates. Thus, in the embodiment, the Si content of the steel piece is to be 2.5 to 4.0%. The Si content of the steel piece is preferably 2.7% or more, and more preferably 2.8% or more. Moreover, the Si content of the steel piece is preferably 3.9% or less, and more preferably 3.8% or less.

(0.05 to 1.00% of Mn)

Mn forms MnS and MnSe in the production processes by bonding to S and/or Se explained later. These precipitates act as the inhibitor and induce the secondary recrystallization in steel during final annealing. Moreover, Mn is an element which improves the hot workability of steel. When the Mn content of the steel piece is less than 0.05%, the above is not sufficiently obtained. On the other hand, when the Mn content of the steel piece is more than 1.00%, the secondary recrystallization does not occur and the magnetic characteristics of steel deteriorate. Thus, in the embodiment, the Mn content of the steel piece is to be 0.05 to 1.00%. The Mn content of the steel piece is preferably 0.06% or more. Moreover, the Mn content of the steel piece is preferably 0.50% or less.

(0.02 to 0.10% of C)

C is the element effective for microstructure control until the completion of the decarburization annealing process in the production processes, and thereby, the magnetic characteristics for the grain oriented electrical steel sheet are improved. When the C content of the steel piece is less than 0.02%, or when the C content of the steel piece is more than 0.10%, the above effect in improving the magnetic characteristics are not sufficiently obtained. The C content of the steel piece is preferably 0.03% or more. Moreover, the C content of the steel piece is preferably 0.09% or less.

(0.005 to 0.080% in Total of S+Se)

S and Se form MnS and MnSe which act as the inhibitor by bonding to Mn in the production processes. When the total amount of S and Se of the steel piece is less than 0.005%, it is difficult to obtain the effect for forming MnS and MnSe. On the other hand, when the total amount of S and Se is more than 0.080%, the magnetic characteristics deteriorate, and the steel sheet may become brittle in the higher temperature range. Thus, in the embodiment, the total amount of S and Se of the steel piece is to be 0.005 to 0.080%. The total amount of S and Se of the steel piece is preferably 0.006% or more. Moreover, the total amount of S and Se of the steel piece is preferably 0.070% or less.

(0.01 to 0.07% of sol.Al)

Sol. Al forms AlN which acts as the inhibitor by bonding to N in the production processes. When the sol.Al content of the steel piece is less than 0.01%, AN does not form sufficiently, and thus, the magnetic characteristics deteriorate. On the other hand, when the sol.Al content of the steel piece is more than 0.07%, the magnetic characteristics deteriorate, and the cracks tend to occur during cold rolling. Thus, in the embodiment, the sol.Al content of the steel piece is to be 0.01 to 0.07%. The sol.Al content of the steel piece is preferably 0.02% or more. Moreover, the sol.Al content of the steel piece is preferably 0.05% or less.

(0.005 to 0.020% of N)

N forms AlN which acts as the inhibitor by bonding to Al in the production processes. When the N content of the steel piece is less than 0.005%, AlN does not form sufficiently, and thus, the magnetic characteristics deteriorate. On the other hand, when the N content of the steel piece is more than 0.020%, AlN becomes difficult to act as the inhibitor, and thus, the secondary recrystallization becomes difficult to occur. In addition, the cracks tend to occur during cold rolling. Thus, in the embodiment, the N content of the steel piece is to be 0.005 to 0.020%. The N content of the steel piece is preferably 0.012% or less, and more preferably 0.010% or less.

In the producing method for the grain oriented electrical steel sheet according to the embodiment, the steel piece (slab) may include the impurities. The impurities correspond to elements which are contaminated during industrial production of steel from ores and scrap that are used as a raw material of steel, or from environment of a production process.

Moreover, in the embodiment, the steel piece may include the optional elements in addition to the base elements and the impurities. For example, as substitution for a part of Fe which is the balance, the silicon steel sheet may include the optional elements such as Bi, Te, Pb, Sb, Sn, Cr, and Cu. The optional elements may be included as necessary. Thus, a lower limit of the respective optional elements does not need to be limited, and the lower limit may be 0%. Moreover, even if the optional elements may be included as impurities, the above mentioned effects are not affected.

(0 to 0.03% of Bi)
(0 to 0.03% of Te)
(0 to 0.03% of Pb)

Bi, Te, and Pb are optional elements. When the amount of each of these elements included in the steel piece is 0.03% or less, it is possible to favorably improve the magnetic characteristics for the grain oriented electrical steel sheet. However, when the amount of each of these elements is more than 0.03% respectively, the steel sheet may become brittle in the higher temperature range. Thus, in the embodiment, the amount of each of these elements included in the steel piece is to be 0.03% or less. The lower limit of the amount of each of these elements included in the steel piece is not particularly limited, but may be 0%. In order to favorably obtain the above effect, the amount of each of these elements is preferably 0.0005% or more, and more preferably 0.001% or more.

Herein, at least one of Bi, Te, and Pb may be included in the steel piece. Specifically, the steel piece may be include at least one of 0.0005 to 0.03% of Bi, 0.0005 to 0.03% of Te, and 0.0005 to 0.03% of Pb.

(0 to 0.50% of Sb)
(0 to 0.50% of Sn)
(0 to 0.50% of Cr)
(0 to 1.0% of Cu)

Sb, Sn, Cr, and Cu are optional elements. When these elements are included in the steel piece, it is possible to favorably improve the magnetic characteristics for the grain oriented electrical steel sheet. Thus, in the embodiment, it is preferable to control the amount of each of these elements included in the steel piece to 0.50% or less of Sb, 0.50% or less of Sn, 0.50% or less of Cr, and 1.0% or less of Cu. The lower limit of the amount of each of these elements included in the steel piece is not particularly limited, but may be 0%. In order to favorably obtain the above effect, the amount of each of these elements is preferably 0.0005% or more, and more preferably 0.001% or more.

Herein, at least one of Sb, Sn, Cr, and Cu may be included in the steel piece. Specifically, the steel piece may be include at least one of 0.0005 to 0.50% of Sb, 0.0005 to 0.50% of Sn, 0.0005 to 0.50% of Cr, and 0.0005 to 1.0% of Cu.

The chemical composition of the steel piece may be measured by typical analytical methods for the steel. For instance, the chemical composition may be measured on the basis of the above analytical method.

<Hot Band Annealing Process>

The hot band annealing process (step S113) is the process of optionally annealing the hot rolled steel sheet after the hot rolling process to obtain the hot band annealed steel sheet. By conducting the annealing for the hot rolled steel sheet, the recrystallization occurs in steel, and finally, the excellent magnetic characteristics can be obtained.

The heating method is not particularly limited, and known heating method may be adopted. Moreover, the annealing conditions are not particularly limited. For instance, the hot rolled steel sheet may be held in the temperature range of 900 to 1200° C. for 10 seconds to 5 minutes.

The hot band annealing process may be omitted as necessary.

Moreover, after the hot band annealing process and before the cold rolling process explained below, the surface of the hot rolled steel sheet may be pickled.

<Cold Rolling Process>

The cold rolling process (step S115) is the process of cold-rolling the hot rolled steel sheet after the hot rolling process or the hot band annealed steel sheet after the hot band annealing process by cold-rolling once or by cold-rolling plural times with the intermediate annealing to obtain the cold rolled steel sheet. Since the sheet shape of the hot band annealed steel sheet is excellent due to the hot band annealing, it is possible to reduce the possibility such that the steel sheet is fractured in the first cold rolling. The cold rolling may be conducted three or more times, but the producing cost increases. Thus, it is preferable to conduct the cold rolling once or twice.

In the cold rolling process, the cold rolling method for the steel sheet is not particularly limited, and known method may be adopted. For instance, the cold rolling reduction in final cold rolling (cumulative cold rolling reduction without intermediate annealing or cumulative cold rolling reduction after intermediate annealing) may be in the range of 80 to 95%.

Herein, the final cold rolling reduction (%) is defined as follows.

$$\text{Final cold rolling reduction (\%)}=(1-\text{Sheet thickness of steel sheet after final cold rolling}/\text{Sheet thickness of steel sheet before final cold rolling})\times 100$$

When the final cold rolling reduction is less than 80%, the Goss nuclei may not be formed favorably. On the other hand, when the final cold rolling reduction is more than 95%, the secondary recrystallization may be unstable in the final annealing process. Thus, it is preferable that the cold rolling reduction in final cold rolling is 80 to 95%.

When conducting the cold rolling plural times with the intermediate annealing, the reduction in first cold rolling may be 5 to 50%, and the holding in the intermediate annealing may be conducted in the temperature range of 950 to 1200° C. for 30 seconds to 30 minutes.

The average thickness of the cold rolled steel sheet (thickness after cold rolling) is different from the thickness of the grain oriented electrical steel sheet which includes the thickness of the tension-insulation coating. For instance, the average thickness of the cold rolled steel sheet may be 0.10 to 0.50 mm. In the embodiment, even when the cold rolled steel sheet is the thin sheet whose average thickness is less than 0.22 mm, the adhesion of the tension-insulation coating is favorably improved. Thus, the average thickness of the cold rolled steel sheet may be 0.17 mm or more and 0.20 mm or less.

In the cold rolling process, the aging treatment may be conducted in order to favorably improve the magnetic characteristics of the grain oriented electrical steel sheet. For instance, since the thickness of the steel sheet is reduced by plural passes in the cold rolling, the steel sheet may be held in the temperature range of 100° C. or more for 1 minute or more at least once in the interval of plural passes. By the aging treatment, it is possible to favorably control the primary recrystallized texture in the decarburization annealing process, and as a result, it is possible to obtain the secondary recrystallized texture where the {110}<001> orientation is favorably developed in the final annealing process.

<Decarburization Annealing Process>

The decarburization annealing process (step S117) is the process of decarburization-annealing the cold rolled steel sheet after the cold rolling process to obtain the decarburization annealed steel sheet. In the decarburization annealing process, the cold rolled steel sheet is annealed under predetermined conditions in order to control the primary recrystallized structure.

In the producing method for the grain oriented electrical steel sheet according to the embodiment, the annealing conditions in the decarburization annealing process are not particularly limited, and known conditions may be adopted. For instance, the steel sheet may be held in the temperature range of 750 to 950° C. for 1 to 5 minutes. Moreover, furnace atmosphere may be known moist atmosphere including hydrogen and nitrogen.

<Final Annealing Process>

The final annealing process (step S119) is the process of applying the annealing separator to the decarburization annealed steel sheet after the decarburization annealing process and thereafter final-annealing the decarburization annealed steel sheet to obtain the final annealed steel sheet. In the final annealing, the coiled steel sheet may be held at a higher temperature for a long time in general. Thus, in order to suppress the seizure between the inside and outside of the coiled steel sheet, the annealing separator is applied to the decarburization annealed steel sheet and is dried before the final annealing.

In the final annealing process, the annealing separator applied to the decarburization annealed steel sheet is not particularly limited, and known annealing separator may be adopted. The producing method for the grain oriented electrical steel sheet according to the embodiment is the method for producing the grain oriented electrical steel sheet without the glass film (forsterite film), and thus, the annealing separator which does not form the forsterite film may be adopted. In a case where the annealing separator which forms the forsterite film is adopted, the forsterite film may be removed by grinding or pickling after the final annealing.

(Annealing Separator which does not Form Forsterite Film)

As the annealing separator which does not form the glass film (forsterite film), the annealing separator which mainly includes MgO and $Al_2O_3$ and which includes bismuth chloride may be utilized. For instance, it is preferable that the annealing separator includes MgO and $Al_2O_3$ of 85 mass % or more in total as percent solid, MgO:$Al_2O_3$ which is the mass ratio of MgO and $Al_2O_3$ satisfies 3:7 to 7:3, and the annealing separator includes the bismuth chloride of 0.5 to 15 mass % as compared with the total amount of MgO and $Al_2O_3$ as percent solid. The range of the above mass ratio of MgO and $Al_2O_3$ and the amount of the above bismuth chloride are determined from the viewpoint of obtaining the base steel sheet excellent in the surface smoothness without the glass film.

In regard to the above mass ratio of MgO and $Al_2O_3$, when the amount of MgO exceeds the above range, the glass film may be formed and remained on the steel sheet surface, and thus, the surface of the base steel sheet may not be smoothed. Moreover, in regard to the above mass ratio of MgO and $Al_2O_3$, when the amount of $Al_2O_3$ exceeds the above range, the seizure of $Al_2O_3$ may occur, and thus, the surface of the base steel sheet may not be smoothed. It is more preferable that MgO:$Al_2O_3$ which is the mass ratio of MgO and $Al_2O_3$ satisfies 3.5:6.5 to 6.5:3.5.

In a case where the bismuth chloride is included in the annealing separator, the glass film is easily removed from the steel sheet surface even when the glass film is formed in the final annealing. When the amount of the bismuth chloride is less than 0.5 mass % as compared with the total amount of MgO and $Al_2O_3$, the glass film may be remained. On the other hand, when the amount of the bismuth chloride is more than 15 mass % as compared with the total amount of MgO and $Al_2O_3$, the effect to suppress the seizure between the steel sheets may not be obtained as the annealing separator. The amount of the bismuth chloride is more preferably 3 mass % or more, and more preferably 7 mass % or less, as compared with the total amount of MgO and $Al_2O_3$.

The type of the bismuth chloride is not particularly limited, and known bismuth chloride may be adopted. For instance, bismuth oxychloride (BiOCl), bismuth trichloride ($BiCl_3$), and the like may be used. Moreover, compounds which can form the bismuth oxychloride by reaction in the annealing separator during the final annealing process may be used. For instance, as the compounds which can form the bismuth oxychloride during the final annealing, a mixture of bismuth compound and metal chloride may be used. For instance, as the bismuth compound, bismuth oxide, bismuth hydroxide, bismuth sulfide, bismuth sulfate, bismuth phosphate, bismuth carbonate, bismuth nitrate, organobismuth compound, bismuth halide, and the like may be used. For instance, as the metal chloride, iron chloride, cobalt chloride, nickel chloride, and the like may be used.

After applying the above annealing separator which does not form the forsterite film to the surface of the decarburization annealed steel sheet and drying the annealing separator, the final annealing is conducted. The annealing conditions in the final annealing process are not particularly limited, and known conditions may be adopted. For instance, the steel sheet may be held in the temperature range of 1100 to 1300° C. for 10 to 30 hours. Moreover, furnace atmosphere may be known nitrogen atmosphere or mixed atmosphere of nitrogen and hydrogen. After the final annealing, it is preferable that the redundant annealing separator is removed from the steel sheet surface by water-washing or pickling.

(Annealing Separator which Forms Forsterite Film)

As the annealing separator which forms the glass film (forsterite film), the annealing separator which mainly includes MgO may be utilized. For instance, it is preferable that the annealing separator includes MgO of 60 mass % or more as percent solid.

After applying the annealing separator to the surface of the decarburization annealed steel sheet and drying the annealing separator, the final annealing is conducted. The annealing conditions in the final annealing process are not particularly limited, and known conditions may be adopted. For instance, the steel sheet may be held in the temperature range of 1100 to 1300° C. for 10 to 30 hours. Moreover, furnace atmosphere may be known nitrogen atmosphere or mixed atmosphere of nitrogen and hydrogen.

In a case where the annealing separator which forms the forsterite film is used, MgO in the annealing separator reacts with $SiO_2$ of the steel sheet surface during the final annealing, whereby the forsterite ($Mg_2SiO_4$) is formed. Thus, it is preferable that the forsterite film formed on the surface is removed by grinding or pickling the surface of the final annealed steel sheet after the final annealing. The method for removing the forsterite film from the surface of the final annealed steel sheet is not particularly limited, and known grinding or known pickling may be adopted.

For instance, in order to remove the forsterite film by pickling, the final annealed steel sheet may be immersed in hydrochloric acid of 20 to 40 mass % at 50 to 90° C. for 1 to 5 minutes, be water-washed, and then be dried. Moreover, the final annealed steel sheet may be pickled in mixed solution of fluorinated ammonium and sulfuric acid, be chemically polished in mixed solution of hydrofluoric acid and hydrogen peroxide solution, be water-washed, and then be dried.

<Oxidizing Process>

The oxidizing process (step S121) is the process of conducting the washing treatment, the pickling treatment, and the heat treatment in turn for the final annealed steel sheet after the final annealing process (final annealed steel sheet without the forsterite film) to obtain the oxidized steel sheet. Specifically, the surface of the final annealed steel sheet is washed as the washing treatment, the final annealed steel sheet is pickled using sulfuric acid of 2 to 20 mass % whose temperature is 70 to 90° C. as the pickling treatment, and the final annealed steel sheet is held in the temperature range of 700 to 900° C. for 10 to 60 seconds in the atmosphere where the oxygen concentration is 5 to 21 volume % and the dew point is 10 to 30° C. as the heat treatment.

(Washing Treatment)

The surface of the final annealed steel sheet after the final annealing process is washed. The method for washing the surface of the final annealed steel sheet is not particularly limited, and known washing method may be adopted. For instance, the surface of the final annealed steel sheet may be water-washed.

(Pickling Treatment)

The final annealed steel sheet after the washing treatment is pickled using the sulfuric acid whose concentration is 2 to 20 mass % and whose temperature is 70 to 90° C.

When the sulfuric acid is less than 2 mass %, it is difficult to obtain the grain oriented electrical steel sheet in which $0.01<(Fe_{0.5}-Fe_{0.05})/Fe_{0.5}<0.35$ is satisfied. Also, when the sulfuric acid is more than 20 mass %, it is difficult to obtain the grain oriented electrical steel sheet having the above features. The concentration of the sulfuric acid is preferably 17 mass % or less, and more preferably 12 mass % or less.

Moreover, when the temperature of the sulfuric acid is less than 70° C., the sufficient adhesion is not obtained. On the other hand, when the temperature of the sulfuric acid is more than 90° C., the effect in improving the adhesion is saturated, and the tension which is applied to the steel sheet by the insulating coating is reduced. The temperature of the sulfuric acid is preferably 75° C. or more, and more preferably 80° C. or more. The temperature of the sulfuric acid is preferably 88° C. or less, and more preferably 85° C. or less.

The time for the pickling treatment is not particularly limited. For instance, the final annealed steel sheet may be passed at general line speed in the pickling bath where the above sulfuric acid is included.

(Heat Treatment)

The final annealed steel sheet after the pickling treatment is held in the temperature range of 700 to 900° C. for 10 to 60 seconds in the atmosphere where the oxygen concentration is 5 to 21 volume % and the dew point is 10 to 30° C. By the heat treatment, the layer including mainly iron oxides and the Si included oxide layer are formed on the surface of the final annealed steel sheet. The steel sheet after the heat treatment becomes the steel substrate which satisfies the above conditions (I) and (H).

When the oxygen concentration is less than 5 volume %, it is difficult to obtain the grain oriented electrical steel sheet having the above features. When the oxygen concentration is more than 21 volume %, the oxides are excessively formed, which is not preferable. The oxygen concentration is preferably 15 volume % or more.

When the dew point is less than 10° C., or when the holding temperature is less than 700° C., it is difficult to obtain the grain oriented electrical steel sheet having the above features. When the holding temperature is more than 900° C., the effect is saturated, and the heating cost increases. When the dew point is more than 30° C., it is difficult to obtain the grain oriented electrical steel sheet having the above features.

When the holding time is less than 10 seconds, it is difficult to obtain the grain oriented electrical steel sheet having the above features. Also, when the holding time is more than 60 seconds, it is difficult to obtain the grain oriented electrical steel sheet having the above features.

The dew point is preferably 25° C. or less, more preferably 20° C. or less, and further more preferably less than 20° C. The holding temperature is preferably 750° C. or more, and more preferably 800° C. or more. The holding time is preferably 20 seconds or more. The holding time is preferably 50 seconds or less, and more preferably 40 seconds or less.

<Second Pickling Process>

In the forming method for the insulation coating according to the embodiment, a second pickling treatment may be conducted, as necessary, after the oxidizing process and before the insulation coating forming process. In the second pickling treatment, the oxidized steel sheet after the oxidizing process may be pickled using a sulfuric acid of 1 to 5 mass % whose temperature is 70 to 90° C.

By conducting the above second pickling treatment, it is possible to certainly form the oxide layer including the layer including mainly iron oxides and the Si included oxide layer on the surface of the oxidized steel sheet. Moreover, it is possible to certainly obtain the grain oriented electrical steel sheet satisfying the above (formula 101).

The concentration of the sulfuric acid is preferably 3 mass % or less. Moreover, the temperature of the sulfuric acid is preferably 75° C. or more, and more preferably 80° C. or more. The temperature of the sulfuric acid is preferably 88° C. or less, and more preferably 85° C. or less.

<Insulation Coating Forming Process>

The insulation coating forming process (step S123) is the process of applying the solution for forming the tension-insulation coating to the surface of the oxidized steel sheet after the oxidizing process or after the second pickling process, and of baking the solution so as to form the tension-insulation coating with an average thickness of 1 to 3 μm. In the insulation coating forming process, the tension-insulation coating may be formed on one sheet surface or both sheet surfaces of the oxidized steel sheet.

Before applying the solution, the surface of the oxidized steel sheet to form the insulation coating may be subjected to optional pretreatment such as degreasing treatment with alkaline, pickling treatment with hydrochloric acid, sulfuric acid, phosphoric acid, and the like. The pretreatment may not be conducted.

The conditions for forming the tension-insulation coating are not particularly limited, and known conditions may be adopted. Moreover, the tension-insulation coating may mainly include inorganics and may further include organics. For instance, the tension-insulation coating may mainly include at least one of metal chromate, metal phosphate, colloidal silica, Zr compound, Ti compound, and the like as the inorganics, and fine particles of organic resin may be dispersed in the tension-insulation coating. From the viewpoint of reducing the environmental loading during producing, the tension-insulation coating may be produced from starting material such as metal phosphate, coupling agents of Zr or Ti, carbonates thereof, ammonium salts thereof.

<Other Processes>

(Flattening Annealing Process)

Following the insulation coating forming process, the flattening annealing may be conducted for straightening. By conducting the flattening annealing for the grain oriented electrical steel sheet after the insulation coating forming process, it is possible to favorably reduce the iron loss characteristics.

(Magnetic Domain Refining Process)

The magnetic domain refining treatment may be conducted for the produced grain oriented electrical steel sheet. Herein, the magnetic domain refining treatment is the treatment such that the laser beam which refines the magnetic domain is irradiated to the surface of the grain oriented electrical steel sheet or the groove is formed on the surface of the grain oriented electrical steel sheet. By conducting the magnetic domain refining treatment, it is possible to favorably reduce the magnetic characteristics.

EXAMPLES

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

A steel slab was heated to 1350° C., and then were hot-rolled to obtain the hot rolled steel sheets having the average thickness of 2.3 mm, herein the steel slab including 0.081 mass % of C, 3.3 mass % of Si, 0.083 mass % of Mn, 0.022 mass % of S (0.022 mass % of S+Se), 0.025 mass % of sol.Al, 0.008 mass % of N, 0.0025 mass % of Bi, and the balance consisting of Fe and impurities.

The obtained hot rolled steel sheets were annealed at 1100° C. for 120 seconds, and then were pickled. The steel sheets after pickling were cold-rolled to obtain the cold rolled steel sheets having the average thickness of 0.23 mm. The obtained cold rolled steel sheets were decarburization-annealed.

Subsequently, the annealing separator was applied and dried. In the annealing separator, MgO and $Al_2O_3$ of 95 mass % in total as percent solid were included, the mixing ratio of MgO and $Al_2O_3$ was 50%:50% in mass %, and BiOCl of 5 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheets. In the steel sheets, the glass film (forsterite film) was not formed when confirmed by X-ray diffraction method.

The steel sheets after removing the redundant annealing separator by water-washing were subjected to the pickling treatment using the sulfuric acid whose concentration was 5 mass % and whose temperature was 70° C. Thereafter, the heat treatment was conducted at 850° C. for 10 seconds in (A) 100% of $N_2$ and 30° C. of dew point and (B) atmospheric air (specifically 21% of $O_2$ and 79% of $N_2$) and 10° C. of dew point.

The aqueous solution which mainly included aluminum phosphate and colloidal silica was applied to the steel sheets after the oxidizing process, the solution was baked at 850° C. for 1 minute, and thereby, the tension-insulation coating whose coating weight was 4.5 g/m$^2$ per one side was formed on the surface of the steel sheets.

The base steel sheets of the grain oriented electrical steel sheets were chemically analyzed on the basis of the above method. The any steel sheets included, as the chemical composition, by mass %, 0.002% or less of C, 3.3% of Si, 0.083% of Mn, 0.005% or less of S (0.005% or less of S+Se), 0.005% or less of sol.Al, 0.005% or less of N, 0.0001% of Bi, and the balance consisting of Fe and impurities.

For the obtained grain oriented electrical steel sheets of two types (A) and (B), the GDS analysis, the oxygen content, the magnetic characteristics, and the coating adhesion were evaluated.

<GDS Analysis>

On the basis of the above method, for the surface of the oxidized steel sheet after the oxidizing process and the surface of the grain oriented electrical steel sheet after forming the tension-insulation coating, the glow discharge spectroscopy was conducted using GDA750 produced by Rigaku Corporation. The measurement elements were 0, Si, and Fe for the oxidized steel sheet and O, Al, Si, P, and Fe for the grain oriented electrical steel sheet. The obtained GDS depth profile was evaluated.

(Analysis of Oxygen Content)

On the basis of the above method, the oxygen content in total of the base steel sheet and the oxide layer was measured for the oxidized steel sheet after the oxidizing process.

<Magnetic Characteristics>

A test piece with a length of 300 mm parallel to the rolling direction and a width of 60 mm was subjected to stress relief annealing at 800° C. for 2 hours in nitrogen atmosphere, and was subjected to the magnetic domain refining treatment by the laser irradiation. Eight pieces of the test piece were prepared. The magnetic flux density B8 in the rolling direction (unit: T) (magnetic flux density in 800 A/m) and the iron loss W17/50 (unit: W/kg) (iron loss when excited to 1.7 T at 50 Hz) were evaluated on the basis of the method regulated by JIS C 2556: 2015, using the test pieces. The average of B8 was calculated using the results of the eight test pieces. Moreover, the most favorable value of W17/50 (specifically, the value of the attained iron loss) was obtained from the results of the eight test pieces.

<Adhesion of Insulation Coating>

The test piece whose longitudinal direction corresponded to the rolling direction was taken from the obtained grain oriented electrical steel sheets, and the bend tests of bending diameter ϕ 20 were conducted using cylindrical mandrel bend tester. The surface of the test piece after the bend tests was observed, the fraction of the area where the insulation coating was remained without delamination in the area of the bended part (fraction of remained coating) was calculated, and thereby, the adhesion of the tension-insulation coating was evaluated. When the fraction of remained coating was grade A, it was judged to as acceptable.

Grade A: the fraction of remained coating is 90% or more.

Grade B: the fraction of remained coating is 70% or more and less than 90%.

Grade C: the fraction of remained coating is less than 70%.

<Average Thickness of Tension-Insulation Coating>

A test piece was taken from the obtained grain oriented electrical steel sheet, and the average thickness of the tension-insulation coating was measured by the above method.

In regard to the adhesion of the insulation coating of the obtained grain oriented electrical steel sheet, the adhesion of both steel sheets of the conditions (A) and (B) was Grade A. The average thickness of the tension-insulation coating of both steel sheets of the conditions (A) and (B) was 3.0 μm.

Moreover, in regard to GDS depth profile, the oxidized steel sheets of the condition (A) did not satisfy the above conditions (I) and (II). The grain oriented electrical steel sheets of the condition (A) did not satisfy $0.01<(Fe_{0.5}-Fe_{0.05})/Fe_{0.5<0.35}$.

On the other hand, the oxidized steel sheets of the condition (B) satisfied the above conditions (I) and (II). The grain oriented electrical steel sheets of the condition (B) satisfied $0.01<(Fe_{0.5}-Fe_{0.05})/Fe_{0.5<0.35}$.

On the other hand, the oxidized steel sheets of the condition (B) satisfied the above conditions (I) and (II). The grain oriented electrical steel sheets of the condition (A) satisfied $0.01<(Fe_{0.5}-Fe_{0.05})/Fe_{0.5}<0.35$.

Moreover, the oxygen content of the oxidized steel sheets of the condition (A) did not satisfy 0.008 to 0.025%, and the oxygen content of the oxidized steel sheets of the condition (B) satisfied 0.008 to 0.025%.

Moreover, in regard to the magnetic characteristics, the grain oriented electrical steel sheets of the condition (B) showed excellent attained iron loss as compared with the grain oriented electrical steel sheets of the condition (A).

Example 2

A steel slab A (steel piece A) and a steel slab B (steel piece B) were heated to 1350° C., and then were hot-rolled to obtain the hot rolled steel sheets having the average thickness of 2.3 mm, herein the steel slab A including 0.082 mass % of C, 3.3 mass % of Si, 0.082 mass % of Mn, 0.023 mass % of S (0.023 mass % of S+Se), 0.025 mass % of sol.Al, 0.008 mass % of N, and the balance consisting of Fe and impurities, and the steel slab B including. 0.081 mass % of C, 3.3 mass % of Si, 0.083 mass % of Mn, 0.022 mass % of S (0.022 mass % of S+Se), 0.025 mass % of sol.Al, 0.008 mass % of N, 0.0025 mass % of Bi, and the balance consisting of Fe and impurities.

The obtained hot rolled steel sheets were annealed at 1100° C. for 120 seconds, and then were pickled. The steel sheets after pickling were cold-rolled to obtain the cold rolled steel sheets having the average thickness of 0.23 mm. The obtained cold rolled steel sheets were decarburization-annealed.

Subsequently, the annealing separator was applied and dried. In the annealing separator, MgO and $Al_2O_3$ of 95 mass % in total as percent solid were included, the mixing ratio of MgO and $Al_2O_3$ was 50%:50% in mass % (1:1 as mass ratio), and BiOCl of 5 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheet. In any steel sheets, the glass film (forsterite film) was not formed when confirmed by X-ray diffraction method.

The steel sheets after removing the redundant annealing separator by water-washing were subjected to the pickling treatment using the sulfuric acid whose temperature was 70° C. and whose concentration was shown in the following Table 1. Thereafter, the heat treatment was conducted by changing atmosphere, dew point, temperature, and time. Herein, in the test numbers 2-27, after the heat treatment, the pickling treatment was conducted again using the sulfuric acid whose temperature was 85° C. and whose concentration was 1%.

TABLE 1

| | | | PRODUCTION CONDITIONS OXIDIZING PROCESS | | | | | | | |
|---|---|---|---|---|---|---|---|---|---|---|
| | | | PICKLING | | HEAT TREATMENT | | | | | |
| | | | | | ATMOSPHERE | | | | | |
| No. | STEEL TYPE | WASHING WASHING METHOD | CONCENTRATION OF SULFURIC ACID mass % | TEMPERATURE ° C. | OXYGEN CONCENTRATION volume % | NITROGEN CONCENTRATION volume % | HYDROGEN CONCENTRATION volume % | DEW POINT ° C. | TEMPERATURE ° C. | TIME seconds |
| 2-1 | A | Water Washing | 5 | 70 | 21 | 79 | 0 | 15 | 800 | 5 |
| 2-2 | A | Water Washing | 5 | 70 | 21 | 79 | 0 | 15 | 850 | 15 |
| 2-3 | A | Water Washing | 5 | 70 | 21 | 79 | 0 | 10 | 800 | 40 |
| 2-4 | A | Water Washing | 15 | 70 | 21 | 79 | 0 | 20 | 680 | 20 |
| 2-5 | A | Water Washing | 15 | 70 | 21 | 79 | 0 | 10 | 800 | 30 |
| 2-6 | A | Water Washing | 15 | 70 | 21 | 79 | 0 | 10 | 840 | 20 |
| 2-7 | A | Water Washing | 3 | 70 | 21 | 79 | 0 | 15 | 800 | 80 |
| 2-8 | A | Water Washing | 15 | 70 | 21 | 79 | 0 | 10 | 800 | 30 |
| 2-9 | A | Water Washing | 15 | 70 | 21 | 79 | 0 | 40 | 800 | 30 |
| 2-10 | A | Water Washing | 15 | 70 | 0 | 96 | 4 | 40 | 850 | 30 |
| 2-11 | A | Water Washing | 15 | 70 | 21 | 79 | 0 | 10 | 800 | 80 |
| 2-12 | A | Water Washing | 5 | 70 | 0 | 100 | 0 | 40 | 800 | 40 |
| 2-13 | A | Water Washing | 25 | 70 | 21 | 79 | 0 | 10 | 680 | 20 |
| 2-14 | B | Water Washing | 5 | 70 | 21 | 79 | 0 | 15 | 800 | 5 |
| 2-15 | B | Water Washing | 5 | 70 | 21 | 79 | 0 | 15 | 850 | 15 |
| 2-16 | B | Water Washing | 5 | 70 | 21 | 79 | 0 | 10 | 800 | 40 |
| 2-17 | B | Water Washing | 15 | 70 | 21 | 79 | 0 | 20 | 680 | 20 |
| 2-18 | B | Water Washing | 15 | 70 | 21 | 79 | 0 | 10 | 800 | 30 |
| 2-19 | B | Water Washing | 15 | 70 | 21 | 79 | 0 | 10 | 840 | 20 |
| 2-20 | B | Water Washing | 3 | 70 | 21 | 79 | 0 | 15 | 800 | 80 |
| 2-21 | B | Water Washing | 15 | 70 | 21 | 79 | 0 | 10 | 800 | 30 |
| 2-22 | B | Water Washing | 15 | 70 | 21 | 79 | 0 | 40 | 800 | 30 |
| 2-23 | B | Water Washing | 15 | 70 | 0 | 96 | 4 | 40 | 850 | 30 |
| 2-24 | B | Water Washing | 15 | 70 | 21 | 79 | 0 | 10 | 800 | 80 |
| 2-25 | B | Water Washing | 5 | 70 | 0 | 100 | 0 | 40 | 800 | 40 |
| 2-26 | B | Water Washing | 25 | 70 | 21 | 79 | 0 | 10 | 680 | 20 |
| 2-27 | B | Water Washing | 5 | 70 | 21 | 79 | 0 | 15 | 850 | 15 |

The aqueous solution which mainly included aluminum phosphate and colloidal silica was applied to the steel sheets after the oxidizing process, the solution was baked at 850° C. for 1 minute, and thereby, the tension-insulation coating whose coating weight was 4.5 g/$m^2$ per one side was formed on the surface of the test piece.

The base steel sheets of the grain oriented electrical steel sheets were chemically analyzed on the basis of the above method. The steel sheets made from the steel slab A included, as the chemical composition, by mass %, 0.002% or less of C, 3.3% of Si, 0.082% of Mn, 0.005% or less of S (0.005% or less of S+Se), 0.005% or less of sol.Al, 0.005% or less of N, and the balance consisting of Fe and impurities. The steel sheets made from the steel slab B included, as the chemical composition, by mass %, 0.002% or less of C, 3.3% of Si, 0.083% Mn, 0.005% or less of S (0.005% or less of S+Se), 0.005% or less of sol.Al, 0.005% or less of N, 0.0001 mass % of Bi, and the balance consisting of Fe and impurities.

<Evaluation>

The GDS analysis, the oxygen content, the magnetic characteristics, the coating adhesion, and the like were evaluated. The evaluation methods were as follows.

(Magnetic Characteristics)

A test piece with a length of 300 mm parallel to the rolling direction and a width of 60 mm was subjected to stress relief annealing at 800° C. for 2 hours in nitrogen atmosphere, and was subjected to the magnetic domain refining treatment by the laser irradiation. Ten pieces of the test piece were prepared. The magnetic flux density B8 in the rolling direction (unit: T) (magnetic flux density in 800 A/m) and the iron loss W17/50 (unit: W/kg) (iron loss when excited to 1.7 T at 50 Hz) were evaluated on the basis of the method regulated by JIS C 2556: 2015, using the test pieces. The average of B8 was calculated using the results of the ten test pieces. Moreover, the most favorable value of W17/50 (specifically, the value of the attained iron loss) was obtained from the results of the ten test pieces.

Herein, in regard to the steel type A, when the average of B8 was 1.90 T or more and the most favorable value of W17/50 was 0.700 W/kg or less, it was judged to as acceptable. In regard to the steel type B, when the average of B8 was 1.90 T or more and the most favorable value of W17/50 was 0.650 W/kg or less, it was judged to as acceptable.

(GDS Analysis)

On the basis of the above method, for the surface of the oxidized steel sheet after the oxidizing process and the surface of the grain oriented electrical steel sheet after forming the tension-insulation coating, the analysis was conducted under conditions such that output was 30 W, Ar pressure was 3 hPa, measurement area was 4 mm diameter, and measurement time was 100 seconds in high frequency mode using GDA750 produced by Rigaku Corporation. The measurement elements were 0, Si, and Fe for the oxidized steel sheet and O, Al, Si, P, and Fe for the grain oriented electrical steel sheet. By the obtained GDS depth profile, it was confirmed whether or not the oxidized steel sheets satisfied the above conditions (1) and (11), and whether or not the grain oriented electrical steel sheets satisfied $0.01<(Fe_{0.5}-Fe_{0.05})/Fe_{0.5}<0.35$.

(Analysis of Oxygen Content)

On the basis of the above method, the oxygen content in total of the base steel sheet and the oxide layer was measured for the oxidized steel sheet after the oxidizing process.

(Adhesion of Tension-Insulation Coating)

The test piece whose longitudinal direction corresponded to the rolling direction was taken from the obtained grain oriented electrical steel sheets, and the bend tests of bending diameter ϕ10 and bending diameter ϕ20 were conducted using cylindrical mandrel bend tester. The surface of the test piece after the bend tests was observed, the fraction of the area where the insulation coating was remained without delamination in the area of the bended part (fraction of remained coating) was calculated, and thereby, the adhesion of the tension-insulation coating was evaluated. When the fraction of remained coating was grade A, it was judged to as acceptable.

Grade A: the fraction of remained coating is 90% or more.

Grade B: the fraction of remained coating is 70% or more and less than 90%.

Grade C: the fraction of remained coating is less than 70%.

(Average Thickness of Tension-Insulation Coating)

The test piece was taken from the obtained grain oriented electrical steel sheets, and the average thickness of the tension-insulation coating was measured on the basis of the above method.

The obtained results are summarized in the following Table 2.

TABLE 2

| | | PRODUCTION RESULTS | | | | | EVALUATION RESULTS | | | | |
|---|---|---|---|---|---|---|---|---|---|---|---|
| | | AFTER OXIDIZING PROCESS | | | AFTER INSULATION COATING FORMING PROCCESS | | MAGNETIC CHARACTERISTICS | | ADHESION | | |
| No. | STEEL TYPE | CONDITION (I) PRESENCE OF PLATEAU REGION | CONDITION (II) RATIO OF Si EMISSION INTENSITY | OXYGEN CONTENT mass % | $(Fe_{0.5}-Fe_{0.05})/Fe_{0.5}$ | AVERAGE THICKNESS OF INSULATION COATING μm | $B_8$ AVERAGE T | $W_{17/50}$ MOST FAVORABLE VALUE W/kg | ϕ20 BENDING | ϕ10 BENDING | REMARKS |
| 2-1 | A | Presence | 0.016 | 0.007 | 0.01 | 2.0 | 1.925 | 0.736 | C | C | COMPARATIVE EXAMPLE |
| 2-2 | A | Presence | 0.341 | 0.018 | 0.12 | 2.0 | 1.930 | 0.691 | A | A | INVENTIVE EXAMPLE |
| 2-3 | A | Presence | 0.246 | 0.021 | 0.14 | 2.0 | 1.931 | 0.692 | A | A | INVENTIVE EXAMPLE |

TABLE 2-continued

| | | PRODUCTION RESULTS | | | | | EVALUATION RESULTS | | | | |
|---|---|---|---|---|---|---|---|---|---|---|---|
| | | AFTER OXIDIZING PROCESS | | | | AFTER INSULATION COATING FORMING PROCCESS | MAGNETIC CHARACTERISTICS | | ADHESION | | |
| No. | STEEL TYPE | CONDITION (I) PRESENCE OF PLATEAU REGION | CONDITION (II) RATIO OF Si EMISSION INTENSITY | OXYGEN CONTENT mass % | $(Fe_{0.5}-Fe_{0.05})/Fe_{0.5}$ | AVERAGE THICKNESS OF INSULATION COATING μm | $B_8$ AVERAGE T | $W_{17/50}$ MOST FAVORABLE VALUE W/kg | ϕ20 BENDING | ϕ10 BENDING | REMARKS |
| 2-4 | A | Presence | 0.051 | 0.007 | 0.01 | 2.0 | 1.929 | 0.725 | C | C | COMPARATIVE EXAMPLE |
| 2-5 | A | Presence | 0.314 | 0.019 | 0.14 | 2.0 | 1.931 | 0.692 | A | A | INVENTIVE EXAMPLE |
| 2-6 | A | Presence | 0.358 | 0.023 | 0.15 | 2.0 | 1.932 | 0.692 | A | A | INVENTIVE EXAMPLE |
| 2-7 | A | Presence | 0.515 | 0.028 | 0.36 | 2.0 | 1.920 | 0.748 | C | C | COMPARATIVE EXAMPLE |
| 2-8 | A | Presence | 0.345 | 0.018 | 0.22 | 2.0 | 1.932 | 0.699 | A | A | INVENTIVE EXAMPLE |
| 2-9 | A | Presence | 0.110 | 0.041 | 0.38 | 2.0 | 1.915 | 0.762 | C | C | COMPARATIVE EXAMPLE |
| 2-10 | A | Presence | 0.124 | 0.085 | 0.41 | 2.0 | 1.921 | 0.746 | A | A | COMPARATIVE EXAMPLE |
| 2-11 | A | Presence | 0.501 | 0.026 | 0.36 | 2.0 | 1.921 | 0.748 | C | C | COMPARATIVE EXAMPLE |
| 2-12 | A | Presence | 0.081 | 0.085 | 0.46 | 2.0 | 1.922 | 0.745 | A | A | COMPARATIVE EXAMPLE |
| 2-13 | A | Presence | 0.051 | 0.007 | 0.01 | 2.0 | 1.921 | 0.746 | C | C | COMPARATIVE EXAMPLE |
| 2-14 | B | Presence | 0.018 | 0.007 | 0.01 | 2.0 | 1.951 | 0.679 | C | C | COMPARATIVE EXAMPLE |
| 2-15 | B | Presence | 0.351 | 0.019 | 0.12 | 2.0 | 1.970 | 0.621 | A | A | INVENTIVE EXAMPLE |
| 2-16 | B | Presence | 0.252 | 0.023 | 0.09 | 2.0 | 1.971 | 0.620 | A | A | INVENTIVE EXAMPLE |
| 2-17 | B | Presence | 0.053 | 0.006 | 0.01 | 2.0 | 1.956 | 0.651 | C | C | COMPARATIVE EXAMPLE |
| 2-18 | B | Presence | 0.335 | 0.021 | 0.16 | 2.0 | 1.971 | 0.622 | A | A | INVENTIVE EXAMPLE |
| 2-19 | B | Presence | 0.415 | 0.022 | 0.15 | 2.0 | 1.973 | 0.621 | A | A | INVENTIVE EXAMPLE |
| 2-20 | B | Presence | 0.525 | 0.028 | 0.37 | 2.0 | 1.953 | 0.662 | C | C | COMPARATIVE EXAMPLE |
| 2-21 | B | Presence | 0.451 | 0.018 | 0.15 | 2.0 | 1.973 | 0.621 | A | A | INVENTIVE EXAMPLE |
| 2-22 | B | Presence | 0.112 | 0.043 | 0.36 | 2.0 | 1.943 | 0.689 | C | C | COMPARATIVE EXAMPLE |
| 2-23 | B | Presence | 0.125 | 0.035 | 0.45 | 2.0 | 1.944 | 0.686 | A | A | COMPARATIVE EXAMPLE |
| 2-24 | B | Presence | 0.503 | 0.027 | 0.36 | 2.0 | 1.949 | 0.673 | C | C | COMPARATIVE EXAMPLE |
| 2-25 | B | Presence | 0.088 | 0.088 | 0.53 | 2.0 | 1.951 | 0.658 | A | A | COMPARATIVE EXAMPLE |
| 2-26 | B | Presence | 0.048 | 0.007 | 0.01 | 2.0 | 1.948 | 0.675 | C | C | COMPARATIVE EXAMPLE |
| 2-27 | B | Presence | 0.342 | 0.014 | 0.12 | 2.0 | 1.970 | 0.621 | A | A | INVENTIVE EXAMPLE |

As clearly shown in the Tables 1 & 2, since the oxidizing conditions were satisfied in the test numbers 2-2, 2-3, 2-5, 2-6, 2-8, 2-15, 2-16, 2-18, 2-19, 2-21, and 2-27, the oxidized steel sheets satisfied the above conditions (I) and (II), and the grain oriented electrical steel sheets satisfied $0.01<(Fe_{0.5}-Fe_{0.05})/Fe_{0.5}<0.35$. As a result, both magnetic characteristics and coating adhesion were excellent.

Moreover, since the chemical compositions of the steel slabs were favorable in the test numbers 2-15, 2-16, 2-18, 2-19, 2-21, and 2-27 among the above test numbers, the magnetic characteristics were further excellent.

On the other hand, since the holding time for oxidizing was shorter in the test number 2-1, the holding temperature for oxidizing was lower in the test number 2-4, the holding time for oxidizing was longer in the test number 2-7, and the dew point for oxidizing was out of the range described above in the test number 2-9, the coating adhesion and the magnetic characteristics were inferior.

Since the atmosphere for oxidizing was out of the range described above in the test number 2-10, the magnetic characteristics were particularly inferior.

Since the holding time for oxidizing was longer in the test number 2-11, the coating adhesion and the magnetic characteristics were inferior.

Since the atmosphere for oxidizing was out of the range described above in the test number 2-12, the magnetic characteristics were particularly inferior.

Since the concentration for pickling was higher and the temperature for oxidizing was lower in the test number 2-13, the coating adhesion and the magnetic characteristics were inferior.

Since the holding time for oxidizing was shorter in the test number 2-14, the holding temperature for oxidizing was lower in the test number 2-17, the holding time for oxidizing was longer in the test number 2-20, and the dew point for oxidizing was out of the range described above in the test number 2-22, the coating adhesion and the magnetic characteristics were inferior.

Since the atmosphere for oxidizing was out of the range described above in the test number 2-23, the magnetic characteristics were particularly inferior.

Since the holding time for oxidizing was longer in the test number 2-24, the coating adhesion and the magnetic characteristics were inferior.

Since the atmosphere for oxidizing was out of the range described above in the test number 2-25, the magnetic characteristics were particularly inferior.

Since the concentration for pickling was higher and the temperature for oxidizing was lower in the test number 2-26, the coating adhesion and the magnetic characteristics were inferior.

Example 3

Steel slabs (steel pieces) with chemical compositions shown in the following Table 3 were heated to 1380° C., and then were hot-rolled to obtain the hot rolled steel sheets having the average thickness of 2.3 mm. Some steels were cracked, and thus could not be subjected to subsequent processes.

The hot rolled steel sheets which could be subjected to subsequent processes were annealed at 1120° C. for 120 seconds, and then were pickled. The steel sheets after pickling were cold-rolled to obtain the cold rolled steel sheets having the average thickness of 0.23 mm. Some steels were cracked during cold rolling, and thus could not be subjected to subsequent processes. The steel sheets which could be subjected to subsequent processes were decarburization-annealed.

Subsequently, the annealing separator was applied and dried. In the annealing separator, MgO and $Al_2O_3$ of 94 mass % in total as percent solid were included, the mixing ratio of MgO and $Al_2O_3$ was 50%:50% in mass % (1:1 as mass ratio), and BiOCl of 6 mass % as compared with the total amount of MgO and $Al_2O_3$ was included. Thereafter, the final annealing was conducted at 1200° C. for 20 hours.

The redundant annealing separator is removed by water-washing from the obtained final annealed steel sheet. In any steel sheets, the glass film (forsterite film) was not formed when confirmed by X-ray diffraction method.

The steel sheets after removing the redundant annealing separator by water-washing were subjected to the pickling treatment using the sulfuric acid whose temperature was 70° C. and whose concentration was 10%. Thereafter, the heat treatment was conducted by holding under conditions such as 21% of 02 and 79% of $N_2$ (specifically, atmospheric air), 10° C. of the dew point, 800° C. of the temperature, and 20 seconds of time.

The GDS analysis was conducted by the method which is the same as that in Example 2 for the steel sheets after the oxidizing process. The steel sheets except for the test numbers 3-12 and 3-21 satisfied the above conditions (I) and (II). Moreover, the oxygen content was 0.008 to 0.025%.

Subsequently, the aqueous solution which mainly included aluminum phosphate and colloidal silica was applied, the solution was baked at 850° C. for 1 minute, and thereby, the tension-insulation coating whose coating weight was 4.5 g/m$^2$ per one side was formed on the surface of the test piece.

The base steel sheets of the grain oriented electrical steel sheets were chemically analyzed on the basis of the above method. The chemical compositions are shown in Table 4. In regard to Table 3 and Table 4, the element which is expressed in blanc or "-" in the tables indicates the element in which the purposeful control is not conducted for the amount thereof during production.

TABLE 3

| STEEL | PRODUCTION CONDITIONS CHEMICAL COMPOSITION OF SLAB (STEEL PIECE) (UNIT: mass %, BALANCE CONSISTING OF Fe AND IMPURITIES) | | | | | | | | | | |
|---|---|---|---|---|---|---|---|---|---|---|---|
| TYPE | C | Si | Mn | S | Se | S + Se | sol.Al | N | Bi | Te | Pb |
| A-1 | 0.079 | 3.31 | 0.080 | 0.022 | 0.001 | 0.023 | 0.025 | 0.008 | — | — | — |
| A-2 | 0.078 | 3.51 | 0.077 | 0.002 | 0.051 | 0.053 | 0.024 | 0.008 | — | — | — |
| A-3 | 0.082 | 3.31 | 0.080 | 0.001 | 0.023 | 0.024 | 0.025 | 0.008 | 0.0025 | — | — |
| A-4 | 0.082 | 3.31 | 0.080 | 0.020 | 0.006 | 0.026 | 0.025 | 0.008 | 0.0025 | — | — |
| A-5 | 0.081 | 3.22 | 0.075 | 0.021 | 0.002 | 0.023 | 0.025 | 0.009 | — | 0.0015 | — |
| A-6 | 0.080 | 3.32 | 0.080 | 0.019 | 0.003 | 0.022 | 0.026 | 0.008 | — | — | 0.0015 |
| A-7 | 0.079 | 3.31 | 0.080 | 0.022 | 0.001 | 0.023 | 0.025 | 0.009 | 0.0026 | 0.0005 | — |
| A-8 | 0.078 | 3.51 | 0.077 | 0.001 | 0.018 | 0.019 | 0.024 | 0.008 | — | 0.0018 | 0.0011 |
| A-9 | 0.079 | 3.22 | 0.080 | 0.019 | 0.003 | 0.022 | 0.025 | 0.009 | 0.0021 | — | 0.0015 |
| A-10 | 0.080 | 3.31 | 0.080 | 0.001 | 0.022 | 0.023 | 0.025 | 0.008 | 0.0018 | 0.0018 | 0.0018 |
| A-11 | 0.085 | 3.31 | 0.080 | 0.022 | 0.001 | 0.023 | 0.025 | 0.008 | 0.0141 | 0.0018 | 0.0012 |
| A-12 | 0.071 | 4.05 | 0.081 | 0.019 | 0.051 | 0.070 | 0.025 | 0.008 | — | — | — |
| A-13 | 0.071 | 2.41 | 0.081 | 0.019 | 0.001 | 0.020 | 0.025 | 0.008 | — | — | — |
| A-14 | 0.008 | 3.28 | 0.075 | 0.022 | 0.006 | 0.028 | 0.021 | 0.008 | — | — | — |
| A-15 | 0.209 | 3.15 | 0.051 | 0.021 | 0.006 | 0.027 | 0.031 | 0.006 | — | — | — |
| A-16 | 0.061 | 3.31 | 0.081 | 0.012 | 0.003 | 0.015 | 0.009 | 0.009 | — | — | — |
| A-17 | 0.061 | 3.29 | 0.082 | 0.015 | 0.003 | 0.018 | 0.075 | 0.009 | — | — | — |
| A-18 | 0.072 | 3.19 | 0.008 | 0.051 | 0.001 | 0.052 | 0.018 | 0.008 | — | — | — |
| A-19 | 0.073 | 3.18 | 1.010 | 0.051 | 0.001 | 0.052 | 0.015 | 0.009 | — | — | — |
| A-20 | 0.071 | 3.25 | 0.081 | 0.003 | 0.001 | 0.004 | 0.025 | 0.008 | — | — | — |
| A-21 | 0.071 | 3.19 | 0.051 | 0.095 | 0.001 | 0.096 | 0.019 | 0.008 | — | — | — |
| A-22 | 0.085 | 3.31 | 0.082 | 0.052 | 0.002 | 0.054 | 0.023 | 0.023 | — | — | — |
| A-23 | 0.085 | 3.31 | 0.052 | 0.052 | 0.002 | 0.054 | 0.023 | 0.002 | — | — | — |

TABLE 4

| No. | STEEL TYPE | PRODUCTION RESULTS CHEMICAL COMPOSITION OF GRAIN ORIENTED ELECTRICAL STEEL SHEET (UNIT: mass %, BALANCE CONSISTING OF Fe AND IMPURITIES) C | Si | Mn | S | Se | S + Se | sol.Al | N | Bi | Te | Pb |
|---|---|---|---|---|---|---|---|---|---|---|---|---|
| 3-1 | A-1 | ≤0.002 | 3.31 | 0.080 | ≤0.005 | ≤0.001 | ≤0.005 | ≤0.005 | ≤0.005 | — | — | — |
| 3-2 | A-2 | ≤0.002 | 3.51 | 0.077 | ≤0.005 | ≤0.001 | ≤0.005 | ≤0.005 | ≤0.005 | — | — | — |
| 3-3 | A-3 | ≤0.002 | 3.31 | 0.080 | ≤0.005 | ≤0.001 | ≤0.005 | ≤0.005 | ≤0.005 | 0.0001 | — | — |
| 3-4 | A-4 | ≤0.002 | 3.31 | 0.080 | ≤0.005 | ≤0.001 | ≤0.005 | ≤0.005 | ≤0.005 | 0.0001 | — | — |
| 3-5 | A-5 | ≤0.002 | 3.22 | 0.075 | ≤0.005 | ≤0.001 | ≤0.005 | ≤0.005 | ≤0.005 | — | 0.0001 | — |
| 3-6 | A-6 | ≤0.002 | 3.32 | 0.080 | ≤0.005 | ≤0.001 | ≤0.005 | ≤0.005 | ≤0.005 | — | — | 0.0015 |
| 3-7 | A-7 | ≤0.002 | 3.31 | 0.080 | ≤0.005 | ≤0.001 | ≤0.005 | ≤0.005 | ≤0.005 | 0.0001 | 0.0001 | — |
| 3-8 | A-8 | ≤0.002 | 3.51 | 0.077 | ≤0.005 | ≤0.001 | ≤0.005 | ≤0.005 | ≤0.005 | — | 0.0001 | 0.0011 |
| 3-9 | A-9 | ≤0.002 | 3.22 | 0.080 | ≤0.005 | ≤0.001 | ≤0.005 | ≤0.005 | ≤0.005 | 0.0001 | — | 0.0015 |
| 3-10 | A-10 | ≤0.002 | 3.31 | 0.080 | ≤0.005 | ≤0.001 | ≤0.005 | ≤0.005 | ≤0.005 | 0.0001 | 0.0001 | 0.0018 |
| 3-11 | A-11 | ≤0.002 | 3.31 | 0.080 | ≤0.005 | ≤0.001 | ≤0.005 | ≤0.005 | ≤0.005 | 0.0001 | 0.0001 | 0.0012 |
| 3-12 | A-12 | — | — | — | — | — | — | — | — | — | — | — |
| 3-13 | A-13 | ≤0.002 | 2.41 | 0.081 | ≤0.005 | ≤0.001 | ≤0.005 | ≤0.005 | ≤0.005 | — | — | — |
| 3-14 | A-14 | ≤0.002 | 3.28 | 0.075 | ≤0.005 | ≤0.001 | ≤0.005 | ≤0.005 | ≤0.005 | — | — | — |
| 3-15 | A-15 | ≤0.002 | 3.15 | 0.051 | ≤0.005 | ≤0.001 | ≤0.005 | ≤0.005 | ≤0.005 | — | — | — |
| 3-16 | A-16 | ≤0.002 | 3.31 | 0.081 | ≤0.005 | ≤0.001 | ≤0.005 | ≤0.005 | ≤0.005 | — | — | — |
| 3-17 | A-17 | ≤0.002 | 3.29 | 0.082 | ≤0.005 | ≤0.001 | ≤0.005 | ≤0.005 | ≤0.005 | — | — | — |
| 3-18 | A-18 | ≤0.002 | 3.19 | 0.008 | ≤0.005 | ≤0.001 | ≤0.005 | ≤0.005 | ≤0.005 | — | — | — |
| 3-19 | A-19 | ≤0.002 | 3.18 | 1.010 | ≤0.005 | ≤0.001 | ≤0.005 | ≤0.005 | ≤0.005 | — | — | — |
| 3-20 | A-20 | ≤0.002 | 3.25 | 0.081 | ≤0.005 | ≤0.001 | ≤0.005 | ≤0.005 | ≤0.005 | — | — | — |
| 3-21 | A-21 | — | — | — | — | — | — | — | — | — | — | — |
| 3-22 | A-22 | ≤0.002 | 3.31 | 0.082 | ≤0.005 | ≤0.001 | ≤0.005 | ≤0.005 | ≤0.005 | — | — | — |
| 3-23 | A-23 | ≤0.002 | 3.31 | 0.052 | ≤0.005 | ≤0.001 | ≤0.005 | ≤0.005 | ≤0.005 | — | — | — |

<Evaluation>

The GDS analysis, the oxygen content, the magnetic characteristics, the coating adhesion, and the like were evaluated. The evaluation methods for the GDS analysis, the oxygen content, the coating adhesion, and the average coating thickness were the same as those in the Example 2. The magnetic characteristics were evaluated as follows.

(Magnetic Characteristics)

Ten pieces of the test piece with a length of 300 mm parallel to the rolling direction and a width of 60 mm were prepared. The test pieces were subjected to stress relief annealing at 800° C. for 2 hours in nitrogen atmosphere, and then, the magnetic characteristics in the rolling direction was evaluated on the basis of the method regulated by JIS C 2556: 2015. When the average of the magnetic flux density B8 (unit: T) was 1.90 T or more, it was judged to as acceptable. For the steel sheets whose magnetic flux density B8 was acceptable, the laser beam was irradiated in order to refine the magnetic domain. For the steel sheets for which the laser beam was irradiated, the most favorable value of the iron loss W17/50 (unit: W/kg) (iron loss when excited to 1.7 T at 50 Hz) were evaluated. Herein, when the average of B8 was 1.90 T or more and the most favorable value of W17/50 was 0.700 W/kg or less, it was judged to as acceptable.

The obtained results are summarized in the following Table 5.

TABLE 5

| | | PRODUCTION RESULTS | | | | | EVALUATION RESULTS | | | | |
|---|---|---|---|---|---|---|---|---|---|---|---|
| | | AFTER OXIDIZING PROCESS | | | | AFTER INSULATION COATING FORMING PROCCESS | MAGNETIC CHARACTERISTICS | | ADHESION | | |
| | | CONDITION (I) | CONDITION (II) | | | | | | | | |
| No. | STEEL TYPE | PRESENCE OF PLATEAU REGION | RATIO OF Si EMISSION INTENSITY | OXYGEN CONTENT mass % | ($Fe_{0.5}$-$Fe_{0.05}$)/$Fe_{0.5}$ | AVERAGE THICKNESS OF INSULATION COATING µm | $B_8$ AVERAGE T | $W_{17/50}$ MOST FAVORABLE VALUE W/kg | ϕ20 BENDING | ϕ10 BENDING | REMARKS |
| 3-1 | A-1 | Presence | 0.385 | 0.019 | 0.13 | 2.0 | 1.944 | 0.699 | A | A | INVENTIVE EXAMPLE |
| 3-2 | A-2 | Presence | 0.415 | 0.021 | 0.17 | 2.0 | 1.946 | 0.700 | A | A | INVENTIVE EXAMPLE |
| 3-3 | A-3 | Presence | 0.431 | 0.022 | 0.18 | 2.0 | 1.985 | 0.618 | A | A | INVENTIVE EXAMPLE |
| 3-4 | A-4 | Presence | 0.435 | 0.021 | 0.16 | 2.0 | 1.985 | 0.622 | A | A | INVENTIVE EXAMPLE |
| 3-5 | A-5 | Presence | 0.425 | 0.019 | 0.17 | 2.0 | 1.985 | 0.622 | A | A | INVENTIVE EXAMPLE |
| 3-6 | A-6 | Presence | 0.421 | 0.021 | 0.17 | 2.0 | 1.981 | 0.628 | A | A | INVENTIVE EXAMPLE |
| 3-7 | A-7 | Presence | 0.463 | 0.022 | 0.15 | 2.0 | 1.982 | 0.629 | A | A | INVENTIVE EXAMPLE |

TABLE 5-continued

| No. | STEEL TYPE | PRODUCTION RESULTS: AFTER OXIDIZING PROCESS: CONDITION (I) PRESENCE OF PLATEAU REGION | CONDITION (II) RATIO OF Si EMISSION INTENSITY | OXYGEN CONTENT mass % | $(Fe_{0.5}-Fe_{0.05})/Fe_{0.5}$ | AFTER INSULATION COATING FORMING PROCCESS: AVERAGE THICKNESS OF INSULATION COATING μm | EVALUATION RESULTS: MAGNETIC CHARACTERISTICS: $B_8$ AVERAGE T | $W_{17/50}$ MOST FAVORABLE VALUE W/kg | ADHESION: ϕ20 BENDING | ADHESION: ϕ10 BENDING | REMARKS |
|---|---|---|---|---|---|---|---|---|---|---|---|
| 3-8 | A-8 | Presence | 0.398 | 0.021 | 0.12 | 2.0 | 1.982 | 0.628 | A | A | INVENTIVE EXAMPLE |
| 3-9 | A-9 | Presence | 0.425 | 0.019 | 0.13 | 2.0 | 1.986 | 0.615 | A | A | INVENTIVE EXAMPLE |
| 3-10 | A-10 | Presence | 0.437 | 0.021 | 0.16 | 2.0 | 1.987 | 0.610 | A | A | INVENTIVE EXAMPLE |
| 3-11 | A-11 | Presence | 0.411 | 0.022 | 0.14 | 2.0 | 1.988 | 0.608 | A | A | INVENTIVE EXAMPLE |
| 3-12 | A-12 | — | — | — | — | — | — | — | — | — | COMPARATIVE EXAMPLE |
| 3-13 | A-13 | Presence | 0.425 | 0.021 | 0.13 | 2.0 | 1.681 | — | A | A | COMPARATIVE EXAMPLE |
| 3-14 | A-14 | Presence | 0.418 | 0.022 | 0.14 | 2.0 | 1.661 | — | A | A | COMPARATIVE EXAMPLE |
| 3-15 | A-15 | Presence | 0.421 | 0.018 | 0.12 | 2.0 | 1.721 | — | A | A | COMPARATIVE EXAMPLE |
| 3-16 | A-16 | Presence | 0.435 | 0.019 | 0.13 | 2.0 | 1.691 | — | A | A | COMPARATIVE EXAMPLE |
| 3-17 | A-17 | Presence | 0.441 | 0.019 | 0.16 | 2.0 | 1.681 | — | A | A | COMPARATIVE EXAMPLE |
| 3-18 | A-18 | Presence | 0.465 | 0.018 | 0.15 | 2.0 | 1.722 | — | A | A | COMPARATIVE EXAMPLE |
| 3-19 | A-19 | Presence | 0.397 | 0.019 | 0.18 | 2.0 | 1.701 | — | A | A | COMPARATIVE EXAMPLE |
| 3-20 | A-20 | Presence | 0.427 | 0.018 | 0.11 | 2.0 | 1.725 | — | A | A | COMPARATIVE EXAMPLE |
| 3-21 | A-21 | — | — | — | — | — | — | — | — | — | COMPARATIVE EXAMPLE |
| 3-22 | A-22 | Presence | 0.440 | 0.021 | 0.12 | 2.0 | 1.722 | — | A | A | COMPARATIVE EXAMPLE |
| 3-23 | A-23 | Presence | 0.420 | 0.021 | 0.13 | 2.0 | 1.741 | — | A | A | COMPARATIVE EXAMPLE |

As clearly shown in the Tables 3 to 5, since the chemical compositions of the base steel sheets were satisfied in the test numbers 3-1 to 3-11, both magnetic characteristics and adhesion of the insulation coating were excellent.

Moreover, since the chemical compositions of the steel slabs were favorable in the test numbers 3-3 to 3-11 among the above test numbers, the magnetic characteristics were further excellent.

On the other hand, since the Si content was excessive in the test number 3-12, the steel sheet was fractured during cold rolling.

Since the Si content was insufficient in the test number 3-13, the magnetic characteristics were inferior.

Since the C content was insufficient in the test number 3-14 and the C content was excessive in the test number 3-15, the magnetic characteristics were inferior.

Since the sol.Al content was insufficient in the test number 3-16, the magnetic characteristics were inferior.

Since the sol.Al content was excessive in the test number 3-17, the steel sheet was fractured during cold rolling.

Since the Mn content was insufficient in the test number 3-18 and the Mn content was excessive in the test number 3-19, the magnetic characteristics were inferior.

Since the total amount of S and Se was insufficient in the test number 3-20, the magnetic characteristics were inferior.

Since the total amount of S and Se was excessive in the test number 3-21, the steel sheet was fractured during hot rolling.

Since the N content was excessive in the test number 3-22, the magnetic characteristics were inferior.

Since the N content was insufficient in the test number 3-23, the magnetic characteristics were inferior.

Example 4

Steel slabs (steel pieces) with chemical compositions shown in the following Table 6 were heated to 1350° C., and then were hot-rolled to obtain the hot rolled steel sheets having the average thickness of 2.3 mm.

TABLE 6

| STEEL TYPE | PRODUCTION CONDITIONS CHEMICAL COMPOSITION OF SLAB (STEEL PIECE) (UNIT: mass %, BALANCE CONSISTING OF Fe AND IMPURITIES) C | Si | Mn | S | Se | S + Se | sol.Al | N | Bi | Sb | Sn | Cr | Cu |
|---|---|---|---|---|---|---|---|---|---|---|---|---|---|
| B-1 | 0.081 | 3.35 | 0.081 | 0.022 | — | 0.022 | 0.025 | 0.008 | 0.0031 | — | — | — | — |
| B-2 | 0.083 | 3.25 | 0.082 | 0.023 | — | 0.022 | 0.025 | 0.008 | 0.0031 | — | — | — | — |
| B-3 | 0.082 | 3.30 | 0.082 | 0.023 | — | 0.022 | 0.025 | 0.008 | 0.0025 | — | — | — | — |
| B-4 | 0.081 | 3.30 | 0.083 | 0.022 | — | 0.022 | 0.025 | 0.008 | 0.0025 | — | — | — | — |
| B-5 | 0.082 | 3.30 | 0.082 | 0.023 | — | 0.023 | 0.025 | 0.008 | — | 0.021 | — | — | — |
| B-6 | 0.081 | 3.30 | 0.083 | 0.022 | — | 0.022 | 0.025 | 0.008 | — | — | 0.031 | — | — |
| B-7 | 0.082 | 3.30 | 0.082 | 0.023 | — | 0.023 | 0.025 | 0.008 | — | — | — | 0.052 | — |
| B-8 | 0.081 | 3.30 | 0.083 | 0.022 | — | 0.022 | 0.025 | 0.008 | — | — | — | — | 0.051 |
| B-9 | 0.081 | 3.35 | 0.081 | 0.022 | — | 0.022 | 0.025 | 0.008 | — | — | — | — | — |
| B-10 | 0.081 | 3.35 | 0.081 | 0.022 | — | 0.022 | 0.025 | 0.008 | 0.0025 | — | — | — | — |

The obtained hot rolled steel sheets were annealed at 1100° C. for 120 seconds, and then were pickled. The steel sheets after pickling were cold-rolled to obtain the cold rolled steel sheets having the average thickness of 0.23 mm. The obtained cold rolled steel sheets were decarburization-annealed.

Subsequently, the final annealing was conducted under conditions shown in the following Table 7. In the Table 7, the amount of main materials in the annealing separator is shown as percent solid. Moreover, the amount of the bismuth chloride is shown as the amount compared with the total amount of MgO and $Al_2O_3$.

TABLE 7

| No. | STEEL TYPE | PRODUCTION CONDITIONS FINAL ANNEALING ANNEALING SEPARATOR MAIN MATERIALS TYPE I or II | AMOUNT (TOTAL) mass % | MgO/ $Al_2O_3$ mass ratio | BISMUTH CHLORIDE TYPE | AMOUNT mass % | TEMPERATURE ° C. | TIME hour | REMOVING FILM |
|---|---|---|---|---|---|---|---|---|---|
| 4-1 | B-1 | I | 95 | 1:1 | $BiCl_3$ | 5 | 1200 | 20 | Not Conducted |
| 4-2 | B-2 | I | 95 | 1:1 | $BiCl_3$ | 5 | 1200 | 20 | Not Conducted |
| 4-3 | B-3 | II | 100 | 1:0 | None | — | 1200 | 20 | Conducted |
| 4-4 | B-4 | II | 100 | 1:0 | None | — | 1200 | 20 | Conducted |
| 4-5 | B-5 | I | 93 | 1:1 | BiOCl | 7 | 1200 | 20 | Not Conducted |
| 4-6 | B-6 | I | 93 | 1:1 | BiOCl | 7 | 1200 | 20 | Not Conducted |
| 4-7 | B-7 | I | 93 | 1:1 | BiOCl | 7 | 1200 | 20 | Not Conducted |
| 4-8 | B-8 | I | 93 | 1:1 | BiOCl | 7 | 1200 | 20 | Not Conducted |
| 4-9 | B-9 | I | 93 | 1:1 | BiOCl | 7 | 1200 | 20 | Not Conducted |
| 4-10 | B-9 | I | 93 | 1:1 | BiOCl | 7 | 1200 | 20 | Not Conducted |
| 4-12 | B-9 | I | 93 | 1:1 | BiOCl | 7 | 1200 | 20 | Not Conducted |
| 4-13 | B-9 | I | 93 | 1:1 | BiOCl | 7 | 1200 | 20 | Not Conducted |
| 4-14 | B-9 | I | 93 | 1:1 | BiOCl | 7 | 1200 | 20 | Not Conducted |
| 4-15 | B-9 | I | 93 | 1:1 | BiOCl | 7 | 1200 | 20 | Not Conducted |
| 4-16 | B-10 | I | 93 | 6:4 | $BiCl_3$ | 7 | 1200 | 20 | Not Conducted |
| 4-17 | B-10 | I | 93 | 4:6 | BiOCl | 7 | 1200 | 20 | Not Conducted |

※: "I" indicates "MgO + $Al_2O_3$" and "II" indicates "MgO" in the above table.

The redundant annealing separator is removed by water-washing from the obtained final annealed steel sheet. In any steel sheets except for the test numbers 4-3 and 4-4, the glass film (forsterite film) was not formed when confirmed by X-ray diffraction method. In the steel sheets of the test numbers 4-3 and 4-4, the forsterite film formed on the surface was removed by grinding or pickling the surface of the final annealed steel sheet after the final annealing. Thereafter, in any steel sheets, the glass film (forsterite film) was not formed when confirmed by X-ray diffraction method.

The steel sheets after removing the redundant annealing separator by water-washing (the steel sheets after removing the glass film in the test numbers 4-3 and 4-4) were subjected to the pickling treatment under conditions shown in the following Table 8. Herein, in the test numbers 4-16 and 4-17 shown in the Table 8, the pickling treatment in the oxidizing process was not conducted, and the oxygen concentration in the atmosphere during the heat treatment was 0 volume % (25 volume % of nitrogen and 75 volume % of hydrogen).

TABLE 8

| | | | PRODUCTION CONDITIONS OXIDIZING PROCESS | | | | | | | | |
|---|---|---|---|---|---|---|---|---|---|---|---|
| | | | PICKLING | | HEAT TREATMENT | | | | | | |
| | | | CONCEN- | | ATMOSPHERE | | | | | | |
| No. | STEEL TYPE | WASHING WASHING METHOD | TRATION OF SULFURIC ACID mass % | TEMPER-ATURE ° C. | OXYGEN CONCEN-TRATION volume % | NITROGEN CONCEN-TRATION volume % | HYDROGEN CONCEN-TRATION volume % | DEW POINT ° C. | TEM-PER-ATURE ° C. | TIME seconds |
| 4-1 | B-1 | Water Washing | 10 | 80 | 15 | 85 | 0 | 10 | 800 | 20 |
| 4-2 | B-2 | Water Washing | 10 | 85 | 10 | 90 | 0 | 10 | 800 | 20 |
| 4-3 | B-3 | Water Washing | 10 | 80 | 15 | 85 | 0 | 10 | 800 | 20 |
| 4-4 | B-4 | Water Washing | 10 | 85 | 10 | 90 | 0 | 10 | 800 | 20 |
| 4-5 | B-5 | Water Washing | 10 | 80 | 15 | 85 | 0 | 10 | 800 | 20 |
| 4-6 | B-6 | Water Washing | 10 | 85 | 10 | 90 | 0 | 10 | 800 | 20 |
| 4-7 | B-7 | Water Washing | 10 | 80 | 15 | 85 | 0 | 10 | 800 | 20 |
| 4-8 | B-8 | Water Washing | 10 | 85 | 10 | 90 | 0 | 10 | 800 | 20 |
| 4-9 | B-9 | Water Washing | 1 | 70 | 21 | 79 | 0 | 10 | 800 | 20 |
| 4-10 | B-9 | Water Washing | 10 | 25 | 21 | 79 | 0 | 10 | 800 | 20 |
| 4-12 | B-9 | Water Washing | 10 | 70 | 35 | 65 | 0 | 10 | 800 | 20 |
| 4-13 | B-9 | Water Washing | 10 | 70 | 2 | 98 | 0 | 10 | 800 | 20 |
| 4-14 | B-9 | Water Washing | 10 | 70 | 21 | 79 | 0 | 0 | 800 | 20 |
| 4-15 | B-9 | Water Washing | 10 | 70 | 21 | 79 | 0 | 10 | 950 | 30 |
| 4-16 | B-10 | Water Washing | Not Conducted | Not Conducted | — | 25 | 75 | −2 | 800 | 20 |
| 4-17 | B-10 | Water Washing | Not Conducted | Not Conducted | — | 25 | 75 | 0 | 800 | 10 |

The aqueous solution which mainly included aluminum phosphate and colloidal silica was applied to the steel sheets after the oxidizing process, the solution was baked at 850° C. for 1 minute, and thereby, the tension-insulation coating whose coating weight was 4.5 g/m$^2$ was formed on the surface of the steel sheets. The laser beam was irradiated on the test piece in order to refine the magnetic domain.

The base steel sheets of the grain oriented electrical steel sheets were chemically analyzed on the basis of the above method. The chemical compositions are shown in Table 9. In regard to Table 6 and Table 9, the element which is expressed in blanc or "-" in the tables indicates the element in which the purposeful control is not conducted for the amount thereof during production.

<Evaluation>

The GDS analysis, the oxygen content, the magnetic characteristics, the coating adhesion, and the like were evaluated. The evaluation methods were the same as those in the Example 2. Herein, when the average of B8 was 1.90 T or more and the most favorable value of W17/50 was 0.650 W/kg or less, it was judged to as acceptable.

The obtained results are summarized in the following Table 10.

TABLE 9

| | | PRODUCTION RESULTS CHEMICAL COMPOSITION OF GRAIN ORIENTED ELECTRICAL STEEL SHEET (UNIT: mass %, BALANCE CONSISTING OF Fe AND IMPURITIES) | | | | | | | | | | | | |
|---|---|---|---|---|---|---|---|---|---|---|---|---|---|---|
| No. | STEEL TYPE | C | Si | Mn | S | Se | S + Se | sol.Al | N | Bi | Sb | Sc | Cr | Cu |
| 4-1 | B-1 | ≤0.002 | 3.35 | 0.081 | ≤0.005 | ≤0.001 | ≤0.005 | ≤0.005 | ≤0.005 | 0.0001 | — | — | — | — |
| 4-2 | B-2 | ≤0.002 | 3.25 | 0.082 | ≤0.005 | ≤0.001 | ≤0.005 | ≤0.005 | ≤0.005 | 0.0001 | — | — | — | — |
| 4-3 | B-3 | ≤0.002 | 3.30 | 0.082 | ≤0.005 | ≤0.001 | ≤0.005 | ≤0.005 | ≤0.005 | 0.0001 | — | — | — | — |
| 4-4 | B-4 | ≤0.002 | 3.30 | 0.083 | ≤0.005 | ≤0.001 | ≤0.005 | ≤0.005 | ≤0.005 | 0.0001 | — | — | — | — |
| 4-5 | B-5 | ≤0.002 | 3.30 | 0.082 | ≤0.005 | ≤0.001 | ≤0.005 | ≤0.005 | ≤0.005 | — | 0.021 | — | — | — |
| 4-6 | B-6 | ≤0.002 | 3.30 | 0.083 | ≤0.005 | ≤0.001 | ≤0.005 | ≤0.005 | ≤0.005 | — | — | 0.031 | — | — |
| 4-7 | B-7 | ≤0.002 | 3.30 | 0.082 | ≤0.005 | ≤0.001 | ≤0.005 | ≤0.005 | ≤0.005 | — | — | — | 0.052 | — |
| 4-8 | B-8 | ≤0.002 | 3.30 | 0.083 | ≤0.005 | ≤0.001 | ≤0.005 | ≤0.005 | ≤0.005 | — | — | — | — | 0.051 |
| 4-9 | B-9 | ≤0.002 | 3.35 | 0.081 | ≤0.005 | ≤0.001 | ≤0.005 | ≤0.005 | ≤0.005 | — | — | — | — | — |
| 4-10 | B-9 | ≤0.002 | 3.35 | 0.081 | ≤0.005 | ≤0.001 | ≤0.005 | ≤0.005 | ≤0.005 | — | — | — | — | — |
| 4-12 | B-9 | ≤0.002 | 3.35 | 0.081 | ≤0.005 | ≤0.001 | ≤0.005 | ≤0.005 | ≤0.005 | — | — | — | — | — |
| 4-13 | B-9 | ≤0.002 | 3.35 | 0.081 | ≤0.005 | ≤0.001 | ≤0.005 | ≤0.005 | ≤0.005 | — | — | — | — | — |
| 4-14 | B-9 | ≤0.002 | 3.35 | 0.081 | ≤0.005 | ≤0.001 | ≤0.005 | ≤0.005 | ≤0.005 | — | — | — | — | — |
| 4-15 | B-9 | ≤0.002 | 3.35 | 0.081 | ≤0.005 | ≤0.001 | ≤0.005 | ≤0.005 | ≤0.005 | — | — | — | — | — |
| 4-16 | B-10 | ≤0.002 | 3.35 | 0.081 | ≤0.005 | ≤0.001 | ≤0.005 | ≤0.005 | ≤0.005 | 0.0001 | — | — | — | — |
| 4-17 | B-10 | ≤0.002 | 3.35 | 0.081 | ≤0.005 | ≤0.001 | ≤0.005 | ≤0.005 | ≤0.005 | 0.0001 | — | — | — | — |

TABLE 10

| | | PRODUCTION RESULTS | | | | | EVALUATION RESULTS | | | | |
|---|---|---|---|---|---|---|---|---|---|---|---|
| | | AFTER OXIDIZING PROCESS | | | | AFTER INSULATION COATING FORMING PROCCESS | MAGNETIC CHARACTERISTICS | | ADHESION | | |
| No. | STEEL TYPE | CONDITION (I) PRESENCE OF PLATEAU REGION | CONDITION (II) RATIO OF Si EMISSION INTENSITY | OXYGEN CONTENT mass % | $(Fe_{0.5}-Fe_{0.05})/Fe_{0.5}$ | AVERAGE THICKNESS OF INSULATION COATING µm | $B_8$ AVERAGE T | $W_{17/50}$ MOST FAVORABLE VALUE W/kg | φ20 BENDING | φ10 BENDING | REMARKS |
| 4-1 | B-1 | Presence | 0.323 | 0.017 | 0.15 | 2.0 | 1.979 | 0.604 | A | A | INVENTIVE EXAMPLE |
| 4-2 | B-2 | Presence | 0.435 | 0.014 | 0.21 | 2.0 | 1.981 | 0.601 | A | A | INVENTIVE EXAMPLE |
| 4-3 | B-3 | Presence | 0.341 | 0.013 | 0.22 | 2.0 | 1.977 | 0.607 | A | A | INVENTIVE EXAMPLE |
| 4-4 | B-4 | Presence | 0.336 | 0.021 | 0.28 | 2.0 | 1.978 | 0.603 | A | A | INVENTIVE EXAMPLE |
| 4-5 | B-5 | Presence | 0.229 | 0.019 | 0.26 | 2.0 | 1.958 | 0.611 | A | A | INVENTIVE EXAMPLE |
| 4-6 | B-6 | Presence | 0.287 | 0.009 | 0.19 | 2.0 | 1.954 | 0.613 | A | A | INVENTIVE EXAMPLE |
| 4-7 | B-7 | Presence | 0.199 | 0.011 | 0.27 | 2.0 | 1.953 | 0.612 | A | A | INVENTIVE EXAMPLE |
| 4-8 | B-8 | Presence | 0.188 | 0.012 | 0.31 | 2.0 | 1.956 | 0.613 | A | A | INVENTIVE EXAMPLE |
| 4-9 | B-9 | Presence | 0.120 | 0.007 | 0.36 | 2.0 | 1.923 | 0.721 | B | B | COMPARATIVE EXAMPLE |
| 4-10 | B-9 | Presence | 0.145 | 0.007 | 0.37 | 2.0 | 1.925 | 0.723 | B | B | COMPARATIVE EXAMPLE |
| 4-12 | B-9 | Presence | 0.610 | 0.026 | 0.38 | 2.0 | 1.926 | 0.719 | C | C | COMPARATIVE EXAMPLE |
| 4-13 | B-9 | Presence | 0.110 | 0.007 | 0.36 | 2.0 | 1.922 | 0.721 | C | C | COMPARATIVE EXAMPLE |
| 4-14 | B-9 | Presence | 0.140 | 0.007 | 0.37 | 2.0 | 1.927 | 0.718 | C | C | COMPARATIVE EXAMPLE |
| 4-15 | B-9 | Presence | 0.510 | 0.026 | 0.36 | 2.0 | 1.921 | 0.725 | C | C | COMPARATIVE EXAMPLE |
| 4-16 | B-10 | Absence | 0.782 | 0.007 | 0.36 | 2.0 | 1.962 | 0.698 | C | C | COMPARATIVE EXAMPLE |
| 4-17 | B-10 | Absence | 0.877 | 0.007 | 0.36 | 2.0 | 1.963 | 0.691 | C | C | COMPARATIVE EXAMPLE |

As clearly shown in the Tables 6 to 10, since the chemical compositions of the base steel sheets were satisfied and the production conditions were satisfied in the test numbers 4-1 to 4-8, both magnetic characteristics and adhesion of the tension-insulation coating were excellent. On the other hand, since the production conditions were not favorable in the test numbers 4-9 and 4-17, the magnetic characteristics and the adhesion of the tension-insulation coating were inferior.

INDUSTRIAL APPLICABILITY

According to the above aspects of the present invention, it is possible to provide the grain oriented electrical steel sheet in which the adhesion of the tension-insulation coating is excellent and the iron loss characteristics are also excellent (the iron loss is low) even without the glass film (forsterite film). In addition, it is possible to provide the method for forming the above insulation coating and for producing the above grain oriented electrical steel sheet. Accordingly, the present invention has significant industrial applicability.

REFERENCE SIGNS LIST

10 Grain oriented electrical steel sheet
11 Base steel sheet
13 Tension-insulation coating
15 Oxide layer

What is claimed is:

1. A grain oriented electrical steel sheet without a forsterite film characterized in that the grain oriented electrical steel sheet comprises:

a base steel sheet;

an oxide layer arranged in contact with the base steel sheet; and a tension-insulation coating arranged in contact with the oxide layer, wherein the base steel sheet consists of, as a chemical composition, by mass %, 2.5 to 4.0% of Si,
0.05 to 1.0% of Mn,
0 to 0.01% of C,
0 to 0.005% of S+Se,
0 to 0.01% of sol.Al,
0 to 0.005% of N,
0 to 0.03% of Bi,
0 to 0.03% of Te,
0 to 0.03% of Pb,
0 to 0.50% of Sb,
0 to 0.50% of Sn,
0 to 0.50% of Cr,
0 to 1.0% of Cu, and
a balance consisting of Fe and impurities, the tension-insulation coating is a phosphate-silica mixed tension-insulation coating with an average thickness of 1 to 3 µm, when a glow discharge spectroscopy is conducted in a region from a surface of the tension-insulation coating to an inside of the base steel sheet, when a sputtering time at which a Fe emission intensity becomes 0.5 times as compared with a saturation value thereof on a depth profile is referred to as $Fe_{0.5}$ in unit of seconds, and when a sputtering time at which a Fe emission intensity becomes 0.05 times as compared with the saturation value on the depth profile is referred to as $Fe_{0.5}$ in unit of seconds, the $Fe_{0.5}$ and the $Fe_{0.05}$ satisfy $0.01<(Fe_{0.5}-Fe_{0.05})/Fe_{0.5<0.35}$, and a magnetic flux density B8 in a rolling direction of the grain oriented electrical steel sheet is 1.90 T or more.

2. A producing method for the grain oriented electrical steel sheet without a forsterite film according to claim 1, the producing method characterized in that the producing method includes a hot rolling process of heating and thereafter hot-rolling a steel piece to obtain a hot rolled steel sheet, a hot band annealing process of optionally annealing the hot rolled steel sheet to obtain a hot band annealed steel sheet, a cold rolling process of cold-rolling the hot rolled steel sheet or the hot band annealed steel sheet by cold-rolling once or by cold-rolling plural times with an intermediate annealing to obtain a cold rolled steel sheet, a decarburization annealing process of decarburization-annealing the cold rolled steel sheet to obtain a decarburization annealed steel sheet, a final annealing process of applying an annealing separator to the decarburization annealed steel sheet and thereafter final-annealing the decarburization annealed steel sheet to obtain a final annealed steel sheet, an oxidizing process of conducting a washing treatment, a pickling treatment, and a heat treatment in turn for the final annealed steel sheet to obtain an oxidized steel sheet, and an insulation coating forming process of applying a solution for forming a phosphate-silica mixed tension-insulation coating to a surface of the oxidized steel sheet and of baking the solution so as to form the tension-insulation coating with an average thickness of 1 to 3 um, wherein, in the hot rolling process, the steel piece consists of, as a chemical composition, by mass %, 2.5 to 4.0% of Si, 0.05 to 1.0% of Mn, 0.02 to 0.10% of C, 0.005 to 0.080% of S+Se, 0.01 to 0.07% of sol.Al, 0.005 to 0.020% of N, 0 to 0.03% of Bi, 0 to 0.03% of Te, 0 to 0.03% of Pb, 0 to 0.50% of Sb, 0 to 0.50% of Sn, 0 to 0.50% of Cr, 0 to 1.0% of Cu, and a balance consisting of Fe and impurities, and wherein, in the oxidizing process, as the washing treatment, a surface of the final annealed steel sheet is washed, as the pickling treatment, the final annealed steel sheet is pickled using a sulfuric acid of 2 to 20 mass % whose temperature is 70 to 90° C., and as the heat treatment, the final annealed steel sheet is held in a temperature range of 700 to 900° C. for 10 to 60 seconds in an atmosphere where an oxygen concentration is 5 to 21 volume % and a dew point is 10 to 30° C.

3. The producing method for the grain oriented electrical steel sheet according to claim 2, the producing method further including, after the oxidizing process and before the insulation coating forming process, a second pickling process of pickling the oxidized steel sheet using a sulfuric acid of 1 to 5 mass % whose temperature is 70 to 90° C.

4. The producing method for the grain oriented electrical steel sheet according to claim 2, wherein, in the final annealing process, the annealing separator includes MgO, $Al_2O_3$, and a bismuth chloride.

5. The producing method for the grain oriented electrical steel sheet according to claim 3, wherein, in the final annealing process, the annealing separator includes MgO, $Al_2O_3$, and a bismuth chloride.

6. The producing method for the grain oriented electrical steel sheet according to claim 2, wherein, in the hot rolling process, the steel piece includes, as the chemical composition, by mass %, at least one of 0.0005 to 0.03% of Bi, 0.0005 to 0.03% of Te, and 0.0005 to 0.03% of Pb.

* * * * *